(12) United States Patent
Hayashitani et al.

(10) Patent No.: US 9,544,223 B2
(45) Date of Patent: Jan. 10, 2017

(54) COMMUNICATION SYSTEM, CONTROL APPARATUS, METHOD FOR CONTROLLING SAME, AND PROGRAM

(71) Applicant: NEC Corporation, Tokyo (JP)

(72) Inventors: Masahiro Hayashitani, Tokyo (JP); Yohei Hasegawa, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 14/439,208

(22) PCT Filed: Nov. 14, 2013

(86) PCT No.: PCT/JP2013/080778
§ 371 (c)(1),
(2) Date: Apr. 28, 2015

(87) PCT Pub. No.: WO2014/077313
PCT Pub. Date: May 22, 2014

(65) Prior Publication Data
US 2015/0295818 A1      Oct. 15, 2015

(30) Foreign Application Priority Data

Nov. 16, 2012   (JP) ................................. 2012-252425

(51) Int. Cl.
*H04L 12/703*      (2013.01)
*H04L 12/24*       (2006.01)
(Continued)

(52) U.S. Cl.
CPC ........... *H04L 45/28* (2013.01); *H04L 41/0686* (2013.01); *H04L 41/0816* (2013.01);
(Continued)

(58) Field of Classification Search
CPC .. H04L 41/0816; H04L 41/0896; H04L 45/02; H04L 45/24; H04L 45/28; H04L 45/745; H04L 47/12
(Continued)

(56) References Cited

U.S. PATENT DOCUMENTS 6,603,736 B1 *   8/2003   Huber ................... H04L 49/105
                                                           370/220
2006/0062141 A1 *  3/2006  Oran .................. H04L 12/2854
                                                           370/216
(Continued)

FOREIGN PATENT DOCUMENTS

JP      2003-318983 A    11/2003
JP      2007-053793 A    3/2007
(Continued)

OTHER PUBLICATIONS

International Search Report (ISR) (PCT Form PCT/ISA/210), in PCT/JP2013/080778, dated Jan. 28, 2014.
(Continued)

*Primary Examiner* — Stephen J Clawson
(74) *Attorney, Agent, or Firm* — McGinn IP Law Group, PLLC.

(57) ABSTRACT

A communication system includes: a plurality of nodes each of which is configured to include OAM (Operation Administration and Maintenance) functions; and a control apparatus configured to control the plurality of nodes. Each of the nodes transmits a status change notification including information about a port(s) affected by a failure(s) that has occurred in a network composed by the plurality of nodes to the control apparatus. The control apparatus determines whether to perform route control on the network on the basis of the status change notification and information about a composition of the network.

23 Claims, 24 Drawing Sheets

(51) Int. Cl.
*H04L 12/751* (2013.01)
*H04L 12/707* (2013.01)
*H04L 12/741* (2013.01)
*H04L 12/801* (2013.01)
*H04L 12/26* (2006.01)

(52) U.S. Cl.
CPC .......... *H04L 41/0896* (2013.01); *H04L 41/12* (2013.01); *H04L 43/0817* (2013.01); *H04L 45/02* (2013.01); *H04L 45/24* (2013.01); *H04L 45/745* (2013.01); *H04L 47/12* (2013.01); *H04L 41/065* (2013.01); *H04L 41/0659* (2013.01); *H04L 41/0663* (2013.01)

(58) Field of Classification Search
USPC .......................................................... 370/221
See application file for complete search history.

(56) References Cited

U.S. PATENT DOCUMENTS

| | | | | |
|---|---|---|---|---|
| 2007/0047436 | A1* | 3/2007 | Arai | H04L 49/351 370/219 |
| 2008/0270820 | A1 | 10/2008 | Kondo et al. | |
| 2011/0261723 | A1* | 10/2011 | Yamato | H04L 45/34 370/255 |
| 2011/0286324 | A1* | 11/2011 | Bellagamba | H04L 41/0677 370/219 |
| 2013/0128725 | A1* | 5/2013 | Maggiari | H04L 41/0668 370/225 |
| 2013/0177016 | A1 | 7/2013 | Nakano et al. | |

FOREIGN PATENT DOCUMENTS

| | | |
|---|---|---|
| JP | 2008-066989 A | 3/2008 |
| JP | 2012-090058 A | 5/2012 |
| JP | 2012-170161 A | 9/2012 |
| WO | WO 98/24220 A2 | 6/1998 |
| WO | WO 99/09753 A2 | 2/1999 |

OTHER PUBLICATIONS

Kenji Fujihara, "Proposal of Service Recovery Method Against Wide Area Disaster", Proceedings of the 2012 IEICE Communications Society Conference 2, Aug. 28, 2012 (Aug. 28, 2012), p. 57.
Extended European Search Report dated Jun. 15, 2016.

* cited by examiner

| Match field | Instruction field |
|---|---|
| Port number = Port 4 | Refer to group table |
| ... | ... |

(b)

| | | Type/Fast Failover | |
|---|---|---|---|
| Action | Monitored port | | |
| 1 | Port 2 | Forward from port 2 | |
| 2 | Port 1 | Forward from port 1 | |
| ... | ... | ... | |

(c)

| Match field | Instruction field |
|---|---|
| Port number = Port 1 | Refer to group table |
| Port number = Port 2 | Refer to group table |
| ... | ... |

(d)

| | | Type/Fast Failover | |
|---|---|---|---|
| Action | Monitored port | | |
| 1 | Port 2 | Forward from port 4 | |
| 2 | Port 1 | Forward from port 4 | |
| ... | ... | ... | |

| Match field | Instruction field |
|---|---|
| Port number = Port 4 | Forward from port 3 |
| ... | ... |

(b)

| Type/Fast Failover | | |
|---|---|---|
| Action | Monitored port | |
| 1 | Port 2 | Forward from port 2 |
| 2 | Port 1 | Forward from port 1 |
| ... | ... | ... |

(c)

| Match field | Instruction field |
|---|---|
| Port number = Port 1 | Forward from port 2 |
| ... | ... |

(d)

| Match field | Instruction field |
|---|---|
| Port number = Port 1 | Refer to group table |
| Port number = Port 2 | Refer to group table |
| Port number = Port 3 | Forward from port 4 |
| ... | ... |

(e)

| Type/Fast Failover | | |
|---|---|---|
| Action | Monitored port | |
| 1 | Port 2 | Forward from port 4 |
| 2 | Port 1 | Forward from port 4 |
| ... | ... | ... |

| Match field | Instruction field |
|---|---|
| Port number = Port 4 | Refer to group table |
| ... | ... |

(b)

| Action | Monitored port | Type/Fast Failover |
|---|---|---|
| 1 | Port 2 | Forward from port 2 |
| 2 | Port 1 | Forward from port 1 |
| 3 | Port 3 | Forward from port 3 |
| ... | ... | ... |

(c)

| Match field | Instruction field |
|---|---|
| Port number = Port 1 | Forward from port 2 |
| ... | ... |

(d)

| Match field | Instruction field |
|---|---|
| Port number = Port 1 | Refer to group table |
| Port number = Port 2 | Refer to group table |
| Port number = Port 3 | Refer to group table |
| ... | ... |

(e)

| Action | Monitored port | Type/Fast Failover |
|---|---|---|
| 1 | Port 2 | Forward from port 4 |
| 2 | Port 1 | Forward from port 4 |
| 3 | Port 3 | Forward from port 4 |
| ... | ... | ... |

COMMUNICATION SYSTEM, CONTROL APPARATUS, METHOD FOR CONTROLLING SAME, AND PROGRAM

REFERENCE TO RELATED APPLICATION

The present invention is based upon and claims the benefit of the priority of Japanese patent application No. 2012-252425, filed on Nov. 16, 2012, the disclosure of which is incorporated herein in its entirety by reference thereto.

TECHNICAL FIELD

The present invention relates to a communication system, a control apparatus, a control apparatus control method, and a program. In particular, the present invention relates to: a communication system which includes a control apparatus that controls a network in a centralized manner; a control apparatus; a control apparatus control method; and a program.

BACKGROUND

Recent years have seen operations of transport networks, which enable failure recovery in the data plane without relying on the control plane. Nodes included in such a transport network are provided with OAM (Operation Administration and Maintenance) functions.

Patent Literature 1 discloses a technique that adopts GMPLS (Generalized Multi-Protocol Label Switching) as the control plane. According to Patent Literature 1, when failure recovery can be achieved by optical switches alone (the data plane in Patent Literature 1), the optical switches are switched. If failure recovery cannot be achieved by such optical switches alone, the GMPLS control plane is controlled to achieve failure recovery.

In addition, according to Patent Literature 2, when a failure occurs only in the control plane in a network in which the data plane and the control plane are formed by different media, disconnection of a path in the data plane during data forwarding is prevented.

Patent Literature 3 discloses a technique for efficiently achieving recovery of multiple failures and the like by distributed control.

Patent Literature 4 discloses a technique in which the data plane and the control plane are managed in coordination with each other. According to Patent Literature 4, reliable route status information is acquired by synchronizing the data plane and the control plane.

Patent Literature 1: Japanese Patent Kokai Publication No. JP2003-318983A
Patent Literature 2: Japanese Patent Kokai Publication No. JP2012-170161A
Patent Literature 3: Japanese Patent Kokai Publication No. JP2007-053793A
Patent Literature 4: Japanese Patent Kokai Publication No. JP2008-066989A

SUMMARY

The disclosure of each of the above PTLs is incorporated herein by reference thereto. The following analysis has been made by the present inventors.

By performing failure recovery only in the data plane without relying on the control plane, speedy failure recovery can be expected. However, if multiple failures occur, it is difficult to achieve failure recovery by relying on the data plane alone. In such cases, control (route control) for setting a new route(s) in the control plane is necessary. However, if the control plane is also used for a single failure, for which failure recovery can be expected in the data plane alone, speedy failure recovery cannot be expected.

Thus, it is desirable that speedy failure recovery in the data plane be performed when a single failure occurs and that reliable failure recovery in the control plane be performed when multiple failures occur.

In the control plane according to Patent Literature 1, distributed control using GMPLS is performed. Thus, more time is required to determine the location(s) of a failure(s), compared with the control plane in which centralized control is performed. In addition, even if a single failure is managed, if distributed control is performed in the control plane, management of multiple failures is complex. As a result, reliable failure recovery may not be achieved. In addition, according to the technique disclosed in Patent Literature 1, the control plane is notified of failure information after it is determined that failure recovery in the data plane is impossible. Thus, failure recovery in the control plane is delayed.

In addition, the technique disclosed in Patent Literature 2 is directed to prevention of disconnection of a path in the data plane when a failure occurs in the control plane. Namely, the technique has nothing to do with failure recovery using the data plane and the control plane. In addition, since the technique disclosed in Patent Literature 3 is a failure recovery technique using distributed control as in Patent Literature 1, management of multiple failures is complex. In addition, the technique disclosed in Patent Literature 4 realizes acquisition of reliable route status information by coordinating the data plane and the control plane. Namely, a main object of the technique disclosed in Patent Literature 4 is not failure recovery.

In view of the above circumstances, an object of the present invention is to provide: a communication system in which failure recovery by a plurality of nodes and failure recovery by a control apparatus that controls the plurality of nodes are selectively used as appropriate; a control apparatus; a control apparatus control method; and a program.

According to a first aspect of the present invention, there is provided a communication system, including: a plurality of nodes each of which includes OAM (Operation Administration and Maintenance) functions; and a control apparatus that controls the plurality of nodes; wherein each of the plurality of nodes transmits a status change notification including information about a port(s) affected by a failure(s) that has occurred in a network composed by the plurality of nodes to the control apparatus; and wherein the control apparatus determines whether to perform route control on the network on the basis of the status change notification and information about a composition of the network.

According to a second aspect of the present invention, there is provided a control apparatus, including: a communication unit that receives, from at least one of a plurality of nodes each of which includes OAM (Operation Administration and Maintenance) functions, a status change notification including information about a port(s) affected by a failure(s) that has occurred in a network composed by the plurality of nodes; and a route control determination unit that determines whether to perform route control on the network on the basis of the status change notification and information about a composition of the network.

According to a third aspect of the present invention, there is provided a control apparatus control method, including: receiving, from at least one of a plurality of nodes each of which includes OAM (Operation Administration and Maintenance) functions, a status change notification including information about a port(s) affected by a failure(s) that has occurred in a network composed by the plurality of nodes; and determining whether to perform route control on the network on the basis of the status change notification and information about a composition of the network.

This method is associated with a certain machine, that is, with a control apparatus that controls a network.

According to a fourth aspect of the present invention, there is provided a program, causing a computer controlling a control apparatus to execute processing for: receiving, from at least one of a plurality of nodes forming a network each of which includes OAM (Operation Administration and Maintenance) functions, a status change notification including information about a port(s) affected by a failure(s) that has occurred in the network composed by the plurality of nodes; and determining whether to perform route control in the control plane on the network on the basis of the status change notification and information about a composition of the network.

This program can be recorded in a computer-readable storage medium. The storage medium may be a non-transient storage medium such as a semiconductor memory, a hard disk, a magnetic recording medium, or an optical recording medium. The present invention can be embodied as a computer program product.

According to each aspect of the present invention, there are provided: a communication system in which failure recovery by a plurality of nodes and failure recovery by a control apparatus that controls the plurality of nodes are selectively used as appropriate; a control apparatus; a control apparatus control method; and a program.

BRIEF DESCRIPTION OF THE DRAWINGS

FIG. 21 illustrates exemplary flow tables and group tables.

FIG. 23 illustrates exemplary tables updated by Flow_mod messages.

FIG. 24 illustrates exemplary tables updated by Flow_mod messages.

PREFERRED MODES

Figure 1:
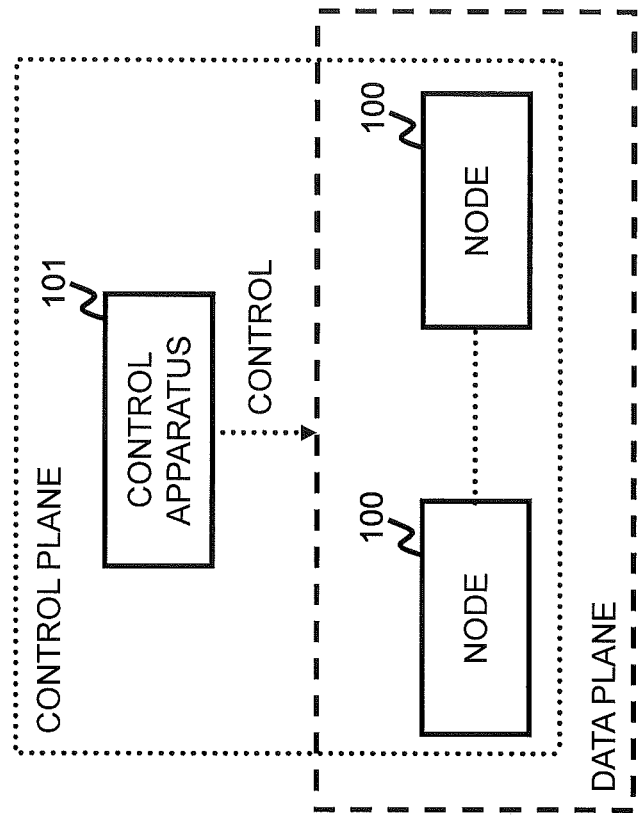
FIG. 1 illustrates an outline of an exemplary embodiment.

First, an outline of an exemplary embodiment will be described with reference to FIG. 1. In the following outline, various components are denoted by reference characters for the sake of convenience.

Namely, the following reference characters are merely used as examples to facilitate understanding of the present invention. Thus, the description of the outline is not meant to place any limitations on the present invention.

As described above, speedy failure recovery can be expected by achieving failure recovery only in the data plane without relying on the control plane. However, if multiple failures occur, it is difficult to achieve failure recovery by only relying on the data plane. Thus, there is demanded a communication system in which speedy failure recovery in the data plane and reliable failure recovery in the control plane are selectively used as appropriate. In an exemplary embodiment, failure recovery in the data plane is achieved by a plurality of nodes including OAM functions, for example. In addition, in an exemplary embodiment, failure recovery in the control plane is achieved by a control apparatus that performs route control on a network composed by the plurality of nodes, for example. In an exemplary embodiment, the data plane is formed by the plurality of nodes. In addition, in an exemplary embodiment, the control plane is formed by the control apparatus. In addition, in an exemplary embodiment, the data plane may be regarded as a lower layer, and the control plane may be regarded as an upper layer of the data plane (the lower layer).

A communication system illustrated in FIG. 1 is provided as an example. The communication system illustrated in FIG. 1 includes: a plurality of nodes 100 that include OAM functions; and a control apparatus 101 that controls the plurality of nodes 100. Each of the nodes 100 transmits a status change notification to the control apparatus 101. The notification includes information about a port(s) affected by a failure(s) that has occurred in a network composed by the nodes 100. The control apparatus 101 determines whether to perform route control on the network on the basis of the status change notification and information about a composition of the network.

If the control apparatus 101 determines that there is no need to perform route control in the control plane, the control apparatus 101 does not perform any particular operations. The control apparatus 101 leaves the recovery from the failure(s) that has occurred in the network to the data plane. Namely, when recovery from a failure(s) can be expected in the data plane, e.g., when a single failure occurs, the control apparatus 101 is not involved in the failure recovery operation. As a result, in the communication system illustrated in FIG. 1, speedy failure recovery in the data plane can be achieved.

However, if the control apparatus 101 determines to perform route control in the control plane, the control apparatus 101 performs appropriate route control on a plurality of nodes 100. In this way, when failure recovery in the data plane cannot be expected, e.g., when multiple failures occur, reliable failure recovery can be achieved.

Hereinafter, specific exemplary embodiments will be described in more detail with reference to the drawings.

[First Exemplary Embodiment]

A first exemplary embodiment will be described with reference to the drawings.

Figure 2:
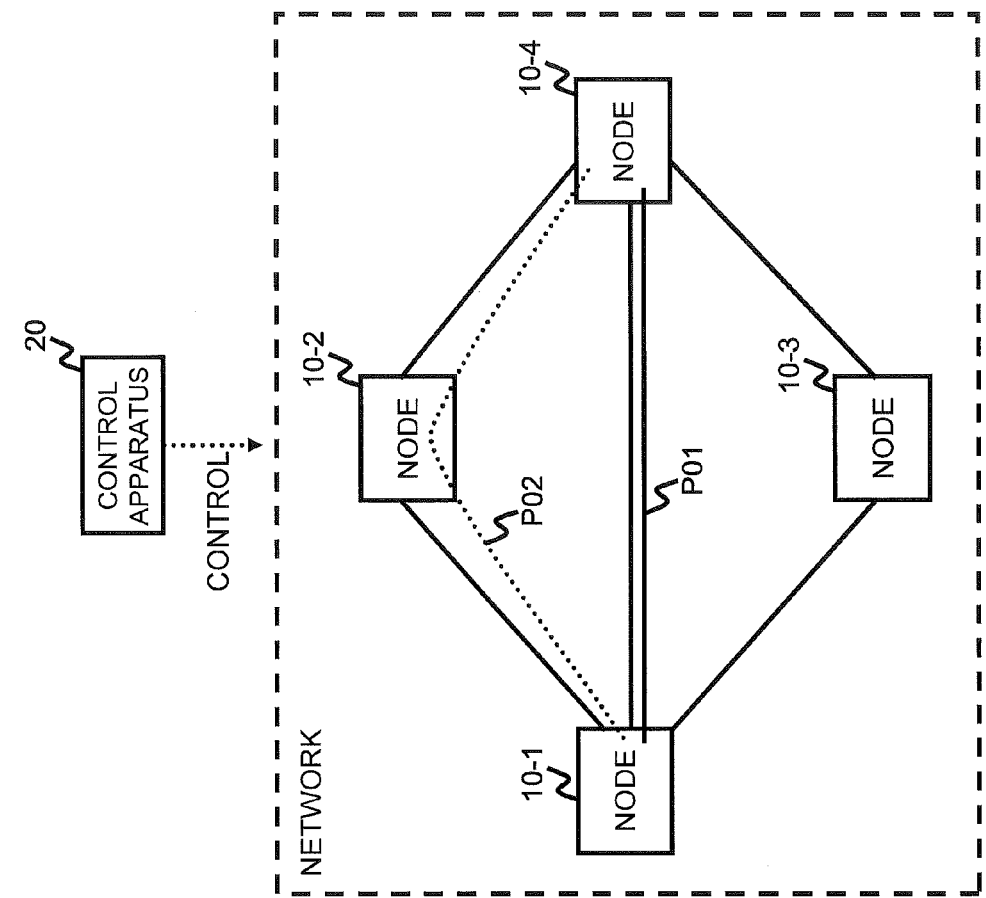
FIG. 2 illustrates an exemplary configuration of a communication system according to a first exemplary embodiment.

FIG. 2 illustrates an exemplary configuration of a communication system according to the first exemplary embodiment. FIG. 2 illustrates a configuration including nodes 10-1 to 10-4 and a control apparatus 20 that controls the nodes 10-1 to 10-4 in a centralized manner. In the first exemplary embodiment, the data plane is a network formed by the plurality of nodes 10-1 to 10-4. In addition, in the first exemplary embodiment, the control plane is formed by the control apparatus 20. The data plane may be regarded as a lower layer, and the control plane may be regarded as an upper layer of the data plane (the lower layer).

The control apparatus 20 sets processing rules (i.e., packet handling rules, termed herein as "packet handling operations") in the nodes 10-1 to 10-4, and these packet handling operations define processing performed on packets received by the nodes 10-1 to 10-4. The nodes 10-1 to 10-4 perform packet processing (packet forwarding) in accordance with the respective packet handling operations set by the control apparatus 20.

In the network illustrated in FIG. 2, paths are set among the nodes 10-1 to 10-4. More specifically, paths P01 and P02 are set in FIG. 2. The path P01 is an active path (a solid line in FIG. 2), and the path P02 is a standby path (a dotted line in FIG. 2). When a failure occurs in the active path P01, the standby path P02 is used as a backup route. In the following description, any one of the nodes 10-1 to 10-4 will be referred to as a "node 10" unless the nodes 10-1 to 10-4 need to be distinguished from each other.

When detecting disconnection of a communication signal, a node 10 transmits a status change notification to the control apparatus 20. Based on the status change notification transmitted from the node 10 and topology information and path information stored in the control apparatus 20, the control apparatus 20 determines whether to perform route control to achieve recovery from a failure that has occurred in the network and performs route control as appropriate. The status change notification, the topology information, and the path information will be described below in detail.

Figure 3:
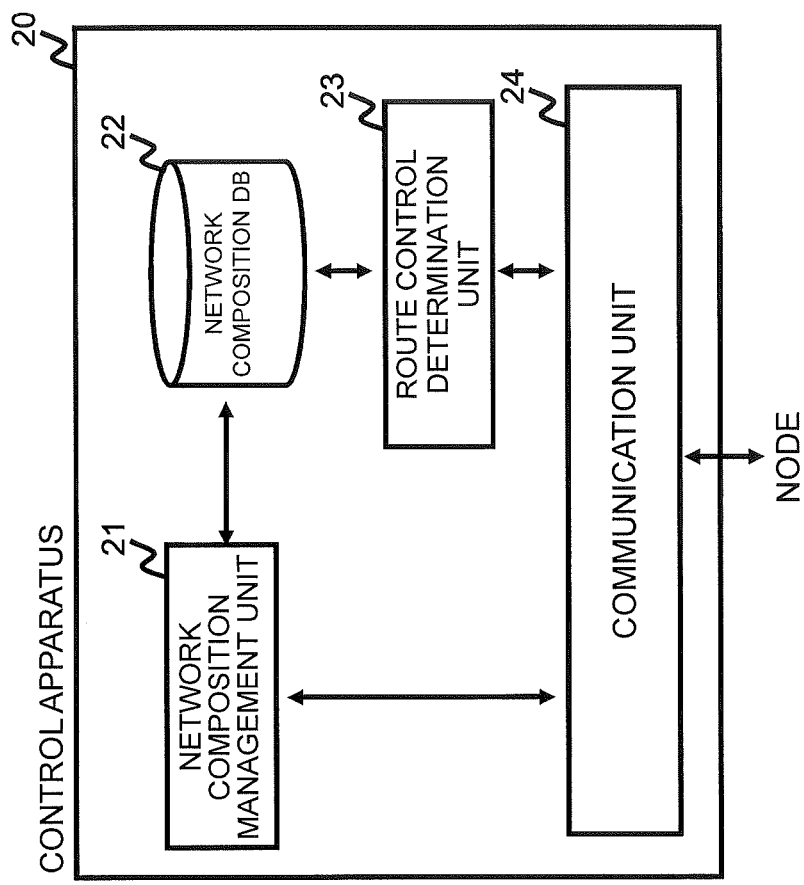
FIG. 3 illustrates an exemplary internal configuration of a control apparatus 20.

FIG. 3 illustrates an exemplary internal configuration of the control apparatus 20. The control apparatus 20 includes a network composition management unit 21, a network composition database (network composition DB) 22, a route control determination unit 23, a communication unit 24 that communicates with the nodes 10 and so forth.

The network composition management unit 21 receives topology information and path information from a network administrator via the communication unit 24. The network composition management unit 21 registers the received topology information and path information in the network composition DB 22. Alternatively, the control apparatus 20 may mutually communicate with the nodes 10, collect the topology information and path information, and register the collected topology information and path information in the network composition DB 22.

The route control determination unit 23 receives status change notifications from nodes 10 via the communication unit 24. When receiving the status change notifications, the route control determination unit 23 refers to the topology information and the path information stored in the network composition DB 22. The route control determination unit 23 determines whether route control is necessary for recovery from the failure on the basis of the status change notifications, the topology information, and the path information (determines whether to perform route control).

If the route control determination unit 23 determines that route control is not necessary for recovery from the failure (determines not to perform route control), the route control determination unit 23 does not perform any particular operations. In contrast, if the route control determination unit 23 determines that route control is necessary for recovery from the failure (determines to perform route control), the route control determination unit 23 gives instructions for determination of a bypass route to a component (not illustrated) that determines the bypass route, for example. Alternatively, the route control determination unit 23 may use the communication unit 24 or the like to notify the network administrator that route control is necessary for recovery from the failure. When notified of such information, the network administrator sets a path necessary for recovery from the failure between or among the relevant nodes 10. Alternatively, the control apparatus 20 may mutually communicate with the nodes 10, collect the topology information and the path information, and register the collected topology information and path information in the network composition DB 22.

Each unit (processing means) of the control apparatus 20 illustrated in FIG. 3 may be realized by a computer program which causes a computer that constitutes the corresponding unit to use its hardware and execute the corresponding processing described below.

A status change notification transmitted from a node 10 includes information about a port whose status has been changed. For example, when a node 10 undergoes a link failure, the node 10 transmits a status change notification including information about the port corresponding to the malfunctioning link.

The topology information is information about the topology (the connection mode) of the network controlled by the control apparatus 20. The topology information includes information about the ports connecting the nodes 10.

Figure 4:
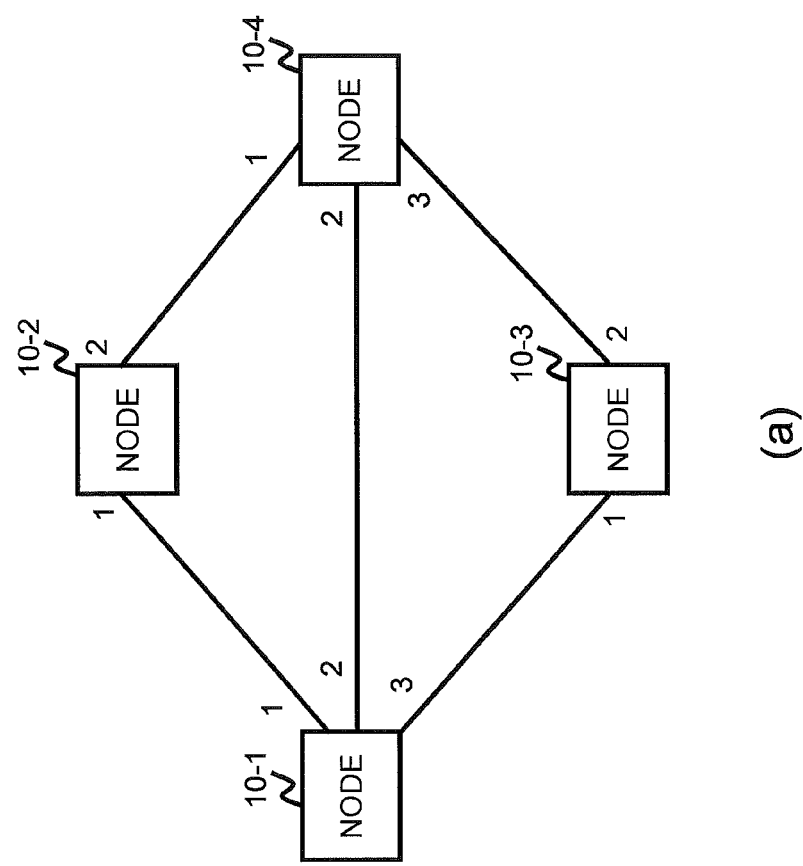
FIG. 4 illustrates exemplary topology information.

FIG. 4 illustrates exemplary topology information. Illustration of the control apparatus 20 is omitted in the network topologies in FIG. 4 and the subsequent drawings. FIG. 4(a) illustrates the topology of the network controlled by the control apparatus 20. In FIG. 4(a), numbers added around solid lines connecting the nodes 10-1 to 10-4 represent connection ports of the nodes. FIG. 4(b) illustrates exemplary topology information in which the topology illustrated in FIG. 4(a) is organized.

The path information is information about the paths in the network controlled by the control apparatus 20. The path information includes information about active and standby paths. More specifically, the path information includes information about the nodes located on each path and information about association between standby and active paths.

Figure 5:
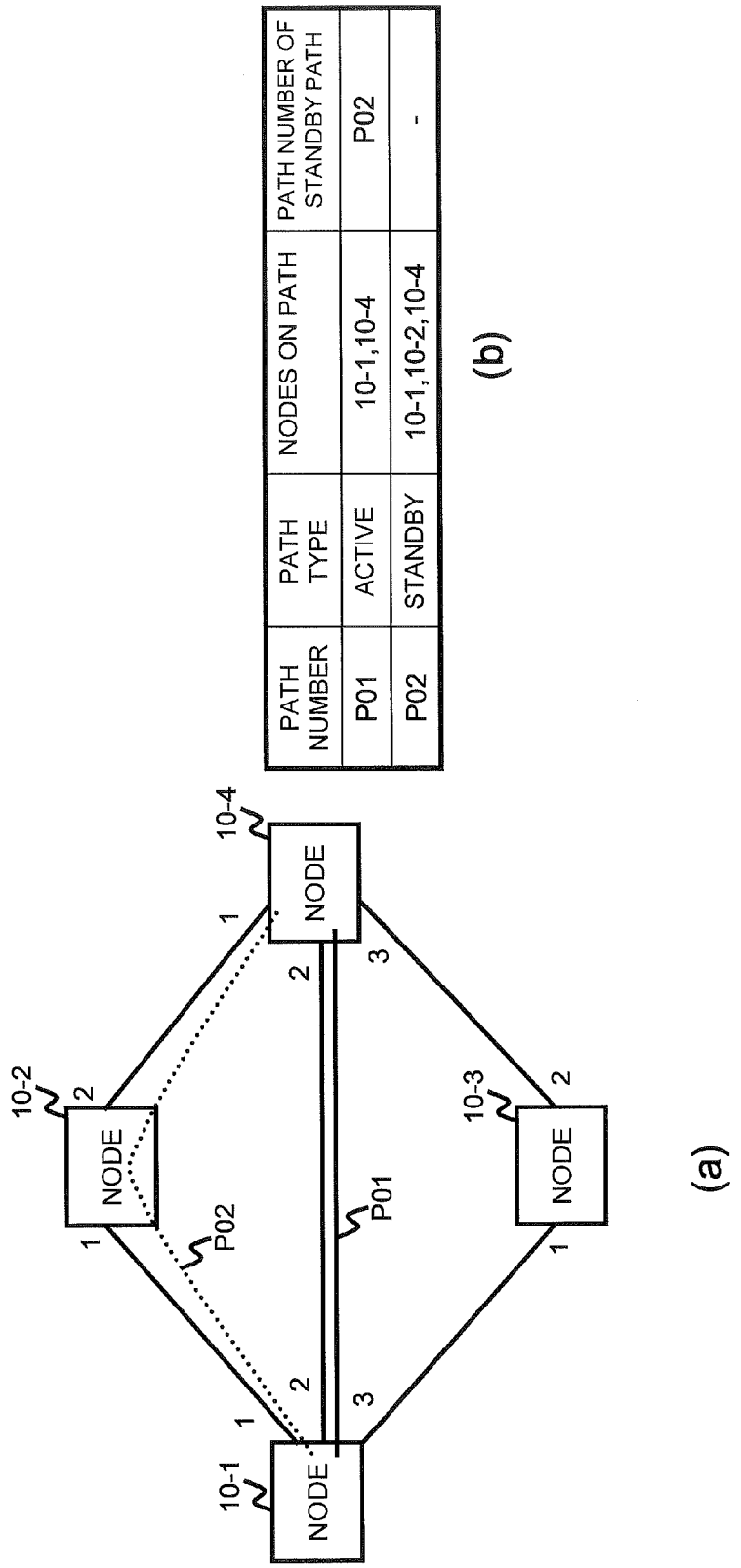
FIG. 5 illustrates exemplary path information.

FIG. 5 illustrates exemplary path information. As illustrated in FIG. 5(a), two paths (paths P01 and P02) are set in the topology illustrated in FIG. 4(a).

The path P01 is an active path on which the nodes 10-1 and 10-4 are located.

The path P02 is a standby path on which the nodes 10-1, 10-2, and 10-4 are located.

FIG. 5(b) illustrates exemplary path information in which these items of information are organized. As can be seen from FIG. 5(b), the control apparatus 20 recognizes that the path P02 is the standby path for the path P01 serving as an active path.

Figure 6:
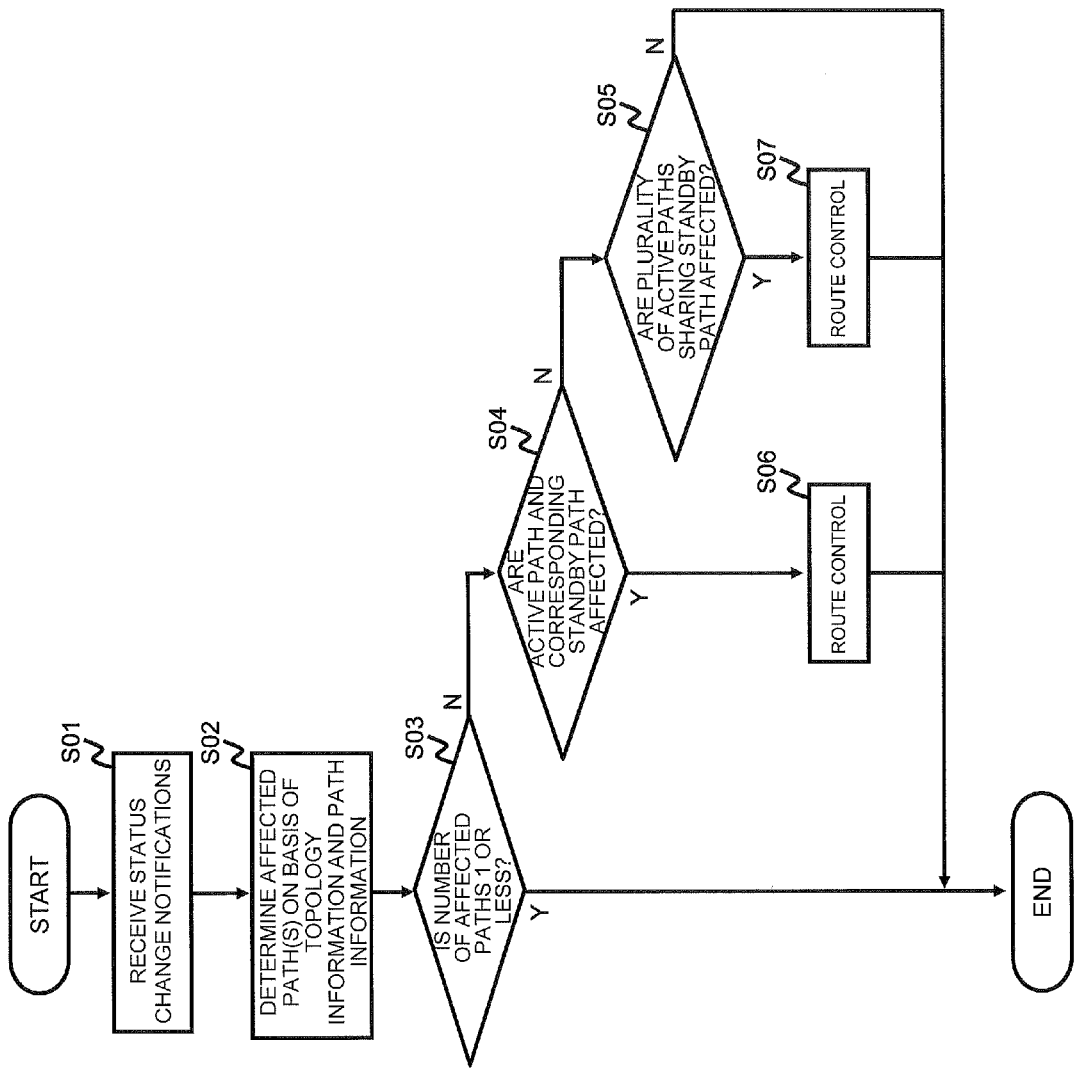
FIG. 6 is a flowchart illustrating an operation of the communication system according to the first exemplary embodiment.

Next, an exemplary operation according to the present exemplary embodiment will be described with reference to the drawings. FIG. 6 is only an example, and the operation of the communication system according to the present exemplary embodiment is not limited to that illustrated in the flowchart in FIG. 6. FIG. 6 is a flowchart illustrating an operation of the communication system according to the first exemplary embodiment.

In step S01, the route control determination unit 23 in the control apparatus 20 receives status change notifications via the communication unit 24.

In step S02, the route control determination unit 23 determines which path(s) is affected by a failure(s) that has occurred in the network, on the basis of the information about the ports whose status has been changed, the topology information, and the path information. The information about the ports is included in the received status change notifications.

In step S03, after determining the affected path(s), the route control determination unit 23 determines the number of affected paths. If the number of affected paths is 1 or less, the route control determination unit 23 ends the present processing in FIG. 6 (Yes in step S03). If the number of affected paths is 1 or less, whether the path is an active path or a standby path, the control apparatus 20 does not perform any particular operations. Namely, if the number of affected paths is 1 and the path is an active path, the OAM functions of the relevant nodes 10 activate a standby path. In this way, the node 10 achieves failure recovery on their own. In contrast, if the number of affected paths is 1 and the path is a standby path, since no active path is affected, the link is maintained.

Figure 7:
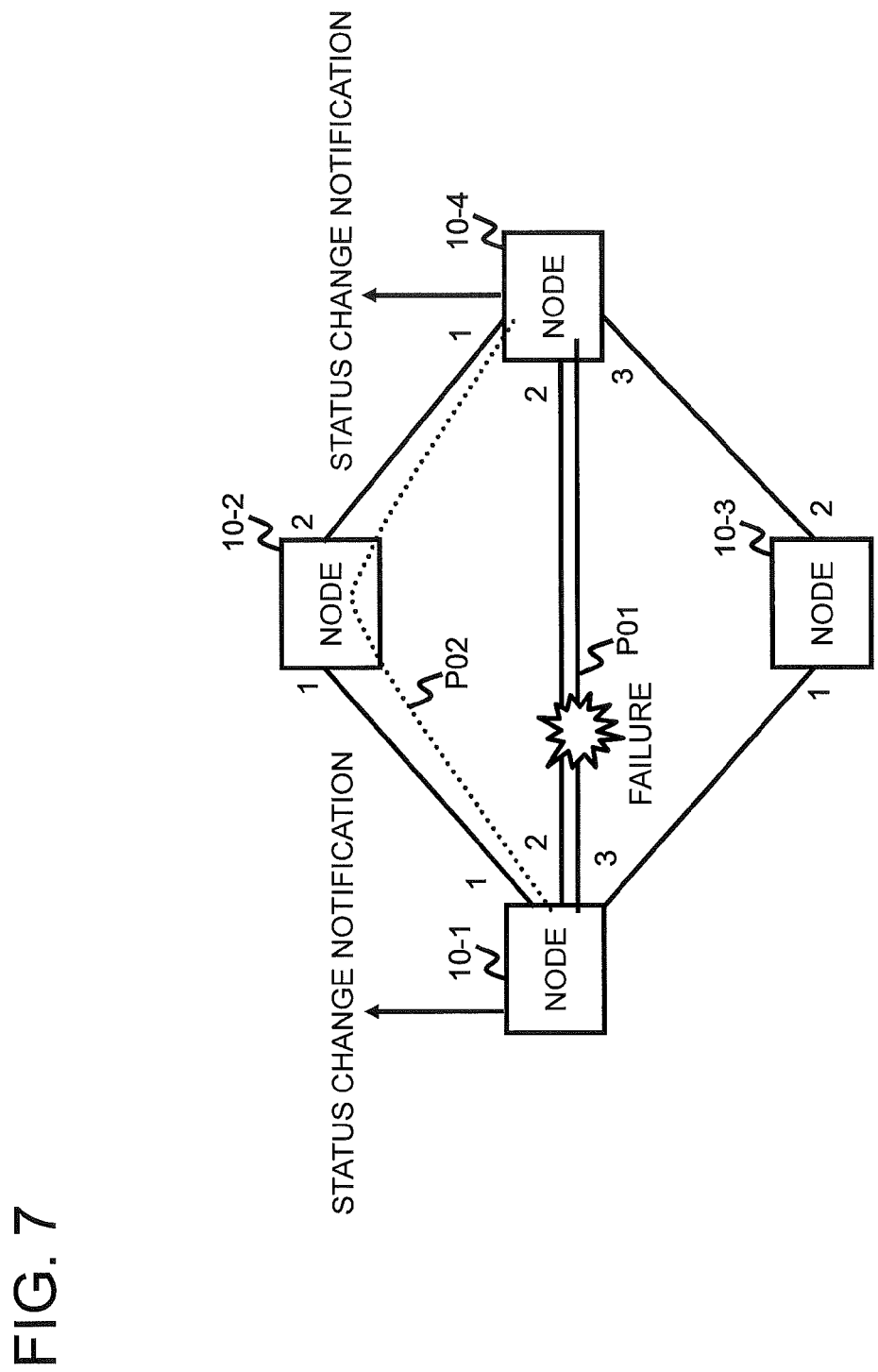
FIG. 7 illustrates an operation performed when a single path is affected by a failure.

FIG. 7 illustrates an operation performed when a single path is affected by a failure. The following description will be made assuming that a failure has occurred in the link between the nodes 10-1 and 10-4 in the network illustrated in FIGS. 4 and 5. If the failure occurs, each of the nodes 10-1 and 10-4 transmits a status change notification to the control apparatus 20.

From the status change notifications, the route control determination unit 23 recognizes that the status of a port 2 of the node 10-1 and the status of a port 2 of the node 10-4 have been changed. By referring to the information about the ports 2 of the respective nodes 10-1 and 10-4 in the topology information, the route control determination unit 23 recognizes that a failure has occurred in the link between the nodes 10-1 and 10-4. In addition, the route control determination unit 23 determines the affected path from the locations affected by the failure in the link (the nodes 10-1 and 10-4 in the example in FIG. 7) and the path information.

In the example in FIG. 7, the route control determination unit 23 determines that the active path P01 is affected by the failure. Since only an active path is affected, the OAM functions can achieve failure recovery in the data plane. Namely, in the case of a single failure, speedy failure recovery can be achieved without relying on the control plane.

If the number of affected paths is 2 or more (No in step S03), the route control determination unit 23 performs necessary steps among steps S04 to S07. Namely, when multiple failures occur in the network, the route control determination unit 23 may perform necessary steps among steps S04 to S07.

In step S04 in FIG. 6, the route control determination unit 23 determines whether both an active path and a standby path associated therewith are affected by failures. If both the active and standby paths are affected by failures (Yes in step S04), the route control determination unit 23 determines that route control is necessary (determines to perform route control), the route control determination unit 23 performs route control (step S06).

Figure 8:
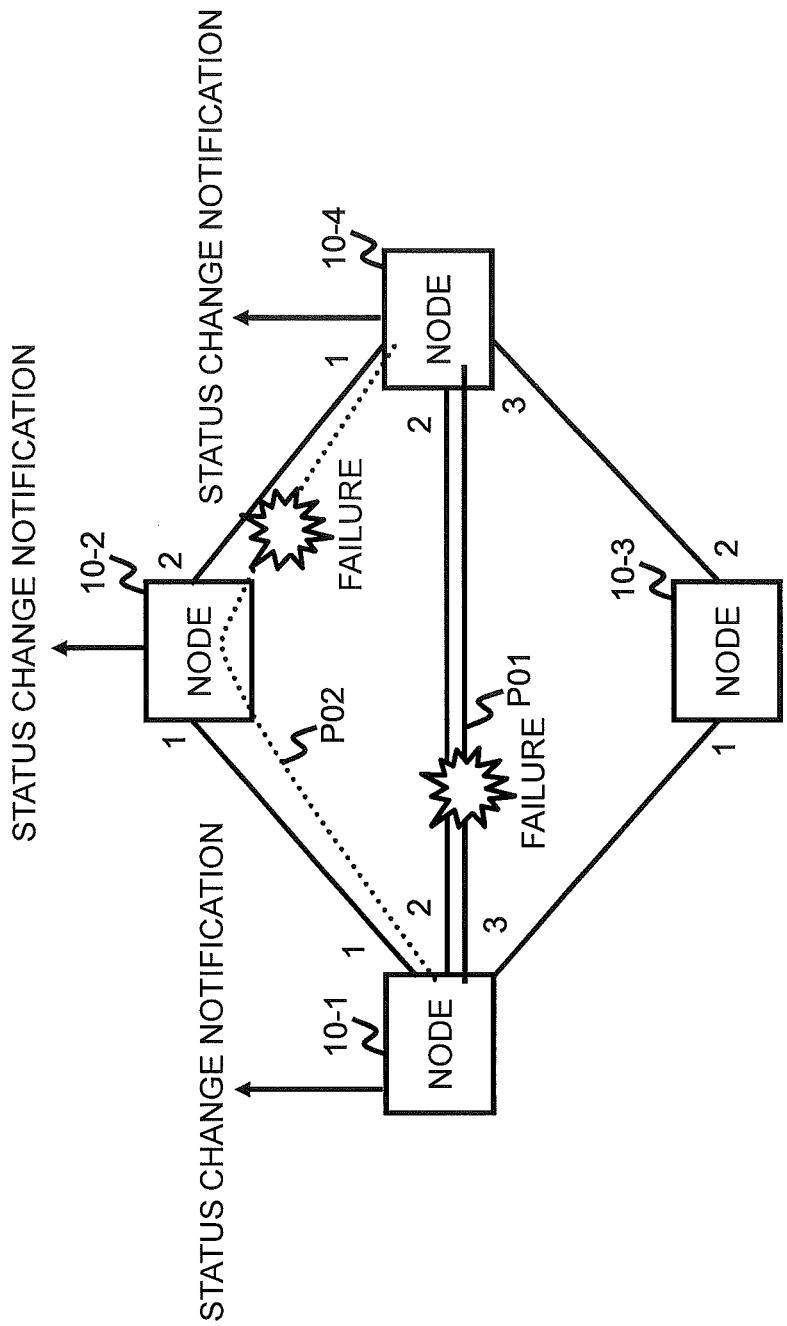
FIG. 8 illustrates an operation performed when both an active path and a standby path are affected by failures, respectively.

FIG. 8 illustrates an operation performed when both an active path and a standby path are affected by failures, respectively. In FIG. 8, a failure has also occurred in the link between the nodes 10-2 and 10-4, in addition to the failure in the link between the nodes 10-1 and 10-4.

In such case, from the status change notifications transmitted from the nodes 10-1, 10-2, and 10-4, the route control determination unit 23 recognizes that the status of the port 2 of the node 10-1, the status of a port 2 of the node 10-2, and the statuses of a port 1 and the port 2 of the node 10-4 have been changed. By referring to the information about each of the ports in the topology information, the route control determination unit 23 recognizes that a failure has occurred in the link between the nodes 10-1 and 10-4 and between the nodes 10-2 and 10-4. In addition, the route control determination unit 23 determines the affected paths from the locations affected by the failures in the links (the nodes 10-1, 10-2, and 10-4 in the example in FIG. 8) and the path information.

In the example in FIG. 8, the route control determination unit 23 determines that the path P01 serving as an active path and the path P02 serving as a standby path associated with the path P01 are affected by the failures. Since both an active path and a standby path prepared as a backup path for the active path are affected by failures, use of the OAM functions cannot achieve failure recovery in the data plane. Thus, failure recovery in the control plane using the control apparatus 20 is performed (step S06).

If both an active path and a standby path corresponding thereto are not affected by failures (No in step S04), the route control determination unit 23 performs step S05.

In step S05, the route control determination unit 23 determines whether a plurality of active paths sharing a standby path are affected by failures. If such active paths are affected by failures (Yes in step S05), the route control determination unit 23 determines that route control is necessary (determines to perform route control), the route control determination unit 23 performs route control (step S07).

Figure 9:
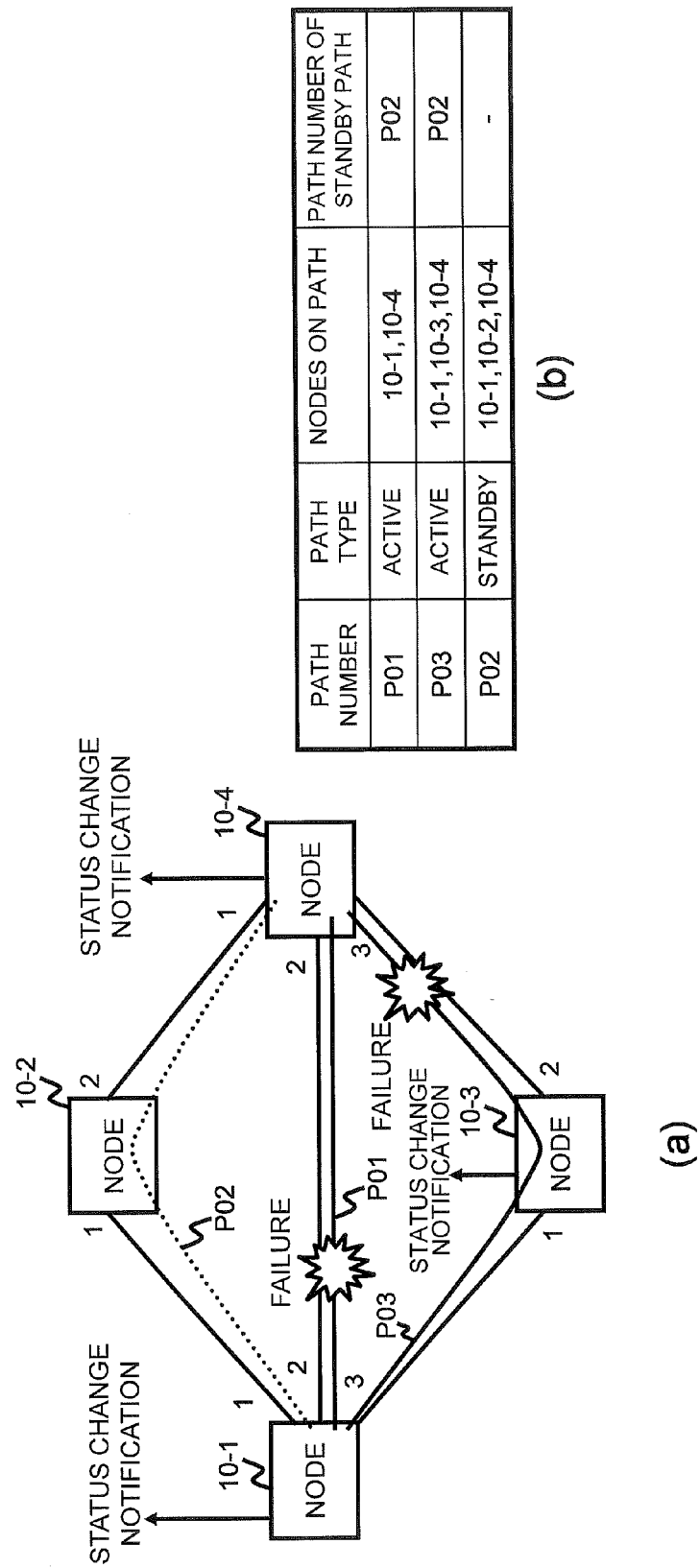
FIG. 9 illustrates an operation performed when a plurality of active paths are affected by failures, respectively.

FIG. 9 illustrates an operation performed when a plurality of active paths are affected by failures, respectively. FIG. 9 will be described assuming that path information illustrated in FIG. 9(b) about the topology illustrated in FIG. 4(a) has been set. Three paths (paths P01 to P03) are formed in a network illustrated in FIG. 9(a).

The path P01 is an active path on which the nodes 10-1 and 10-4 are located.

The path P03 is an active path on which the nodes 10-1, 10-3, and 10-4 are located.

The path P02 is a standby path on which the nodes 10-1, 10-2, and 10-4 are located.

The path P02 is a standby path for the active paths P01 and P03.

FIG. 9(b) illustrates path information in which these items of information are organized. In addition, in FIG. 9(a), a failure has occurred in the link between the nodes 10-1 and 10-4 and between the nodes 10-3 and 10-4.

Each of the nodes 10-1, 10-3, and 10-4 transmits a status change notification to the control apparatus 20. From the received status change notifications, the control apparatus 20 recognizes that the statuses of the port 2 of the node 10-1, a port 2 of the node 10-3, and the port 2 and a port 3 of the node 10-4 have been changed. By referring to the information about each of the ports in the topology information, the route control determination unit 23 recognizes that a failure has occurred in the link between the nodes 10-1 and 10-4 and between the nodes 10-3 and 10-4. In addition, the route control determination unit 23 determines the affected paths from the locations affected by the failures in the links (the node 10-1, 10-3, and 10-4 in the example in FIG. 9) and the path information. In the example in FIG. 9, the route control determination unit 23 determines that the active paths P01 and P03 are the paths affected by the failures.

By referring to the path information, the route control determination unit 23 can recognize that these two active paths (the path P01 and P03) share the path P02 serving as a standby path. When failures occur in two active paths sharing a standby path, even if the OAM functions in the data plane are used, one of the failures in the active paths cannot be eliminated. Thus, the route control determination unit 23 determines to perform failure recovery in the control plane using the control apparatus 20 (step S07).

Figure 10:
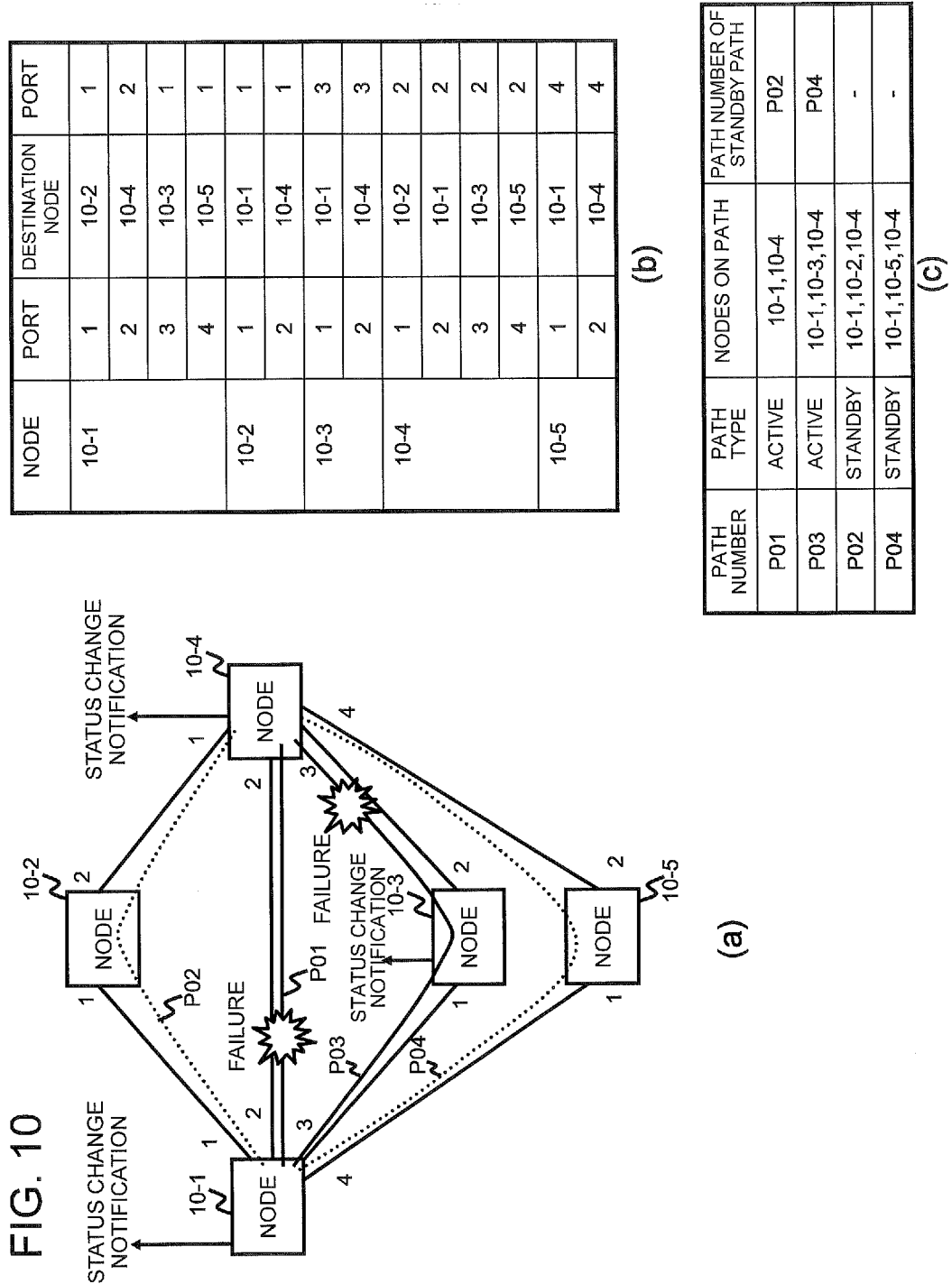
FIG. 10 illustrates an operation performed when a plurality of active paths are affected by failures, respectively, the paths not sharing a standby path.

FIG. 10 illustrates an operation performed when a plurality of active paths are affected by failures, respectively, and the paths do not share a standby path. FIG. 10(a) illustrates a network including a node 10-5 in addition to the nodes in the network illustrated in FIG. 4(a). FIG. 10(b) illustrates topology information in which the topology illustrated in FIG. 10(a) is organized.

Four paths (the paths P01 to P04) are formed in the network in FIG. 10(a).

The path P01 is an active path on which the nodes 10-1 and 10-4 are located.

The path P03 is an active path on which the node 10-1, 10-3, and 10-4 are located.

The path P02 is a standby path on which the nodes 10-1, 10-2, and 10-4 are located and which is set as a standby path for the path P01.

The path P04 is a standby path on which the nodes 10-1, 10-5, and 10-4 are located and which is set as a standby path for the path P03.

FIG. 10(c) illustrates path information in which these items of information are organized.

In FIG. 10(a), as in FIG. 9(a), a failure has occurred in the link between the nodes 10-1 and 10-4 and between nodes 10-3 and 10-4. Thus, each of the nodes 10-1, 10-3, and 10-4 transmits a status change notification to the control apparatus 20. From the received status change notifications, the control apparatus 20 recognizes that the statuses of the port 2 of the node 10-1, the port 2 of the node 10-3, and the ports 2 and 3 of the node 10-4 have been changed.

By referring to the information about each of the above paths in the topology information, the control determination unit 23 recognizes that a failure has occurred in the link between the nodes 10-1 and 10-4 and between the nodes 10-3 and 10-4. In addition, the route control determination unit 23 determines the affected paths from the locations affected by the failures in the links (the nodes 10-1, 10-3, and 10-4 in the example in FIG. 8) and the path information. In the example in FIG. 10, the route control determination unit 23 determines that the paths P01 and P03 serving as active paths are affected by failures. By referring to the path information, the route control determination unit 23 can recognize that these two active paths (the paths P01 and P03) do not share a standby path. Thus, the OAM functions perform failure recovery in the data plane on each of the active paths P01 and P03.

In this way, since failure recovery can be performed without relying on the control plane, the control apparatus 20 does not perform any particular operations. Namely, if a plurality of active paths sharing a standby path are not affected by failures (No in step S05), the route control determination unit 23 ends the present processing illustrated in FIG. 6. Thus, even when two or more paths are affected by failures, there are cases where failure recovery in the control plane is not performed.

As described above, on the basis of a status change notification transmitted from each node, the control apparatus 20 determines whether failure recovery in the data plane is possible or failure recovery in the control plane is necessary. If the control apparatus 20 determines that failure recovery in the data plane is possible, the control apparatus 20 does not perform any particular operations. Namely, the control apparatus 20 leaves the recovery from the failure(s) to the data plane.

However, when multiple failures occur in the network and the control apparatus 20 determines that failure recovery in the data plane alone is difficult, the control apparatus 20 performs necessary processing for recovery from the failures. Namely, in the communication system according to the present exemplary embodiment, when the control apparatus 20 receives a notification(s) of occurrence of a failure(s) (a status change notification(s)) from a node(s), if recovery from the failure(s) is possible in the data plane alone, the control apparatus 20 leaves the recovery from the failure(s) to the data plane. As a result, speedy failure recovery is achieved. However, when the control apparatus 20 determines that failure recovery cannot be achieved in the data plane alone, for example, when multiple failures occur, the control apparatus 20 performs appropriate processing. As a result, reliable failure recovery in the control plane is achieved.

[Second Exemplary Embodiment]

Next, a second exemplary embodiment will be described in detail with reference to the drawings.

Figure 11:
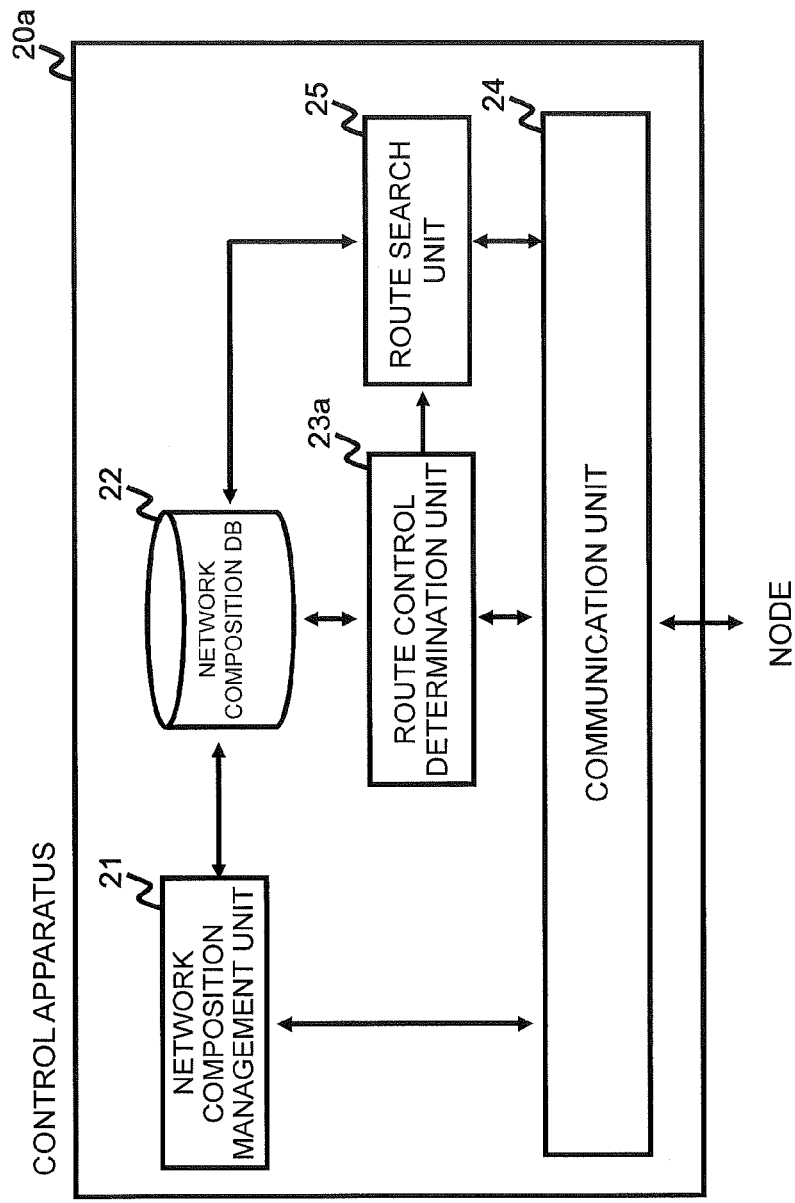
FIG. 11 illustrates an exemplary internal configuration of a control apparatus 20a according to a second exemplary embodiment.

FIG. 11 illustrates an exemplary internal configuration of a control apparatus 20a according to the present exemplary embodiment. The same components between FIGS. 3 and 11 are denoted by the same reference characters, and the descriptions thereof will be omitted.

The control apparatus 20a differs from the control apparatus 20 in that the control apparatus 20a includes a route control determination unit 23a in place of the route control determination unit 23 and newly includes a route search unit 25.

When performing processing in accordance with the flowchart illustrated in FIG. 6, if the route control determination unit 23a determines that failure recovery in the control plane is necessary (steps S06 and S07 in FIG. 6), the route control determination unit 23a outputs path information necessary for route control to the route search unit 25.

On the basis of the received path information and the information stored in the network composition DB 22, the route search unit 25 determines a bypass route necessary for failure recovery. In addition, the route search unit 25 sets packet handling operations for realizing the determined path in the relevant nodes 10 via the communication unit 24. Namely, according to the present exemplary embodiment, when failure recovery in the control plane is necessary, the control apparatus 20a determines a bypass route necessary for failure recovery. Next, the control apparatus 20a sets packet handling operations for realizing the determined path in the relevant nodes 10.

Figure 12:
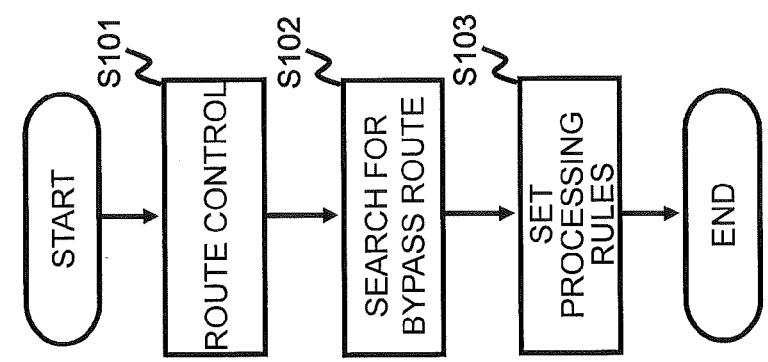
FIG. 12 is a flowchart illustrating an operation of a communication system according to the second exemplary embodiment.

Next, an exemplary operation according to the present exemplary embodiment will be described with reference to the drawings. FIG. 12 is only an example, and the operation of the communication system according to the present exemplary embodiment is not limited to that illustrated in the flowchart in FIG. 12. Namely, FIG. 12 is a flowchart illustrating an exemplary operation in steps S06 and S07 in FIG. 6 described in the first exemplary embodiment.

If "True" is determined in step S04 or S05 in FIG. 6, the control apparatus 20a operates in accordance with the flowchart in FIG. 12.

In step S101, the route control determination unit 23a determines that route control by the control apparatus 20a is necessary (determines that the control apparatus 20a needs to perform route control).

In step S102, the route search unit 25 searches for a bypass route on the basis of the control target paths and the topology information. If "True" is determined in step S04 in FIG. 6 (Yes in step S04), both active and standby paths are affected by failures. Thus, in step S102 corresponding to step S06, the route search unit 25 searches for a bypass route for the active path affected by a failure. In other words, the route search unit 25 does not search for a bypass route for the standby path.

If "True" is determined in step S05 in FIG. 6 (Yes in step S05), the route control determination unit 23a determines that a plurality of active paths are affected by failures. Thus, a standby path is used for one of the plurality of active paths. A search target(s) of a bypass route is an active path(s) that cannot be replaced by the standby path. The present exemplary embodiment assumes that a priority level is previously set in each active path on the basis of a network operation policy or the like so that the route search unit 25 can determine which one of the plurality of active paths is replaced by the standby path for failure recovery. For example, the priority levels are stored in the control apparatus 20a and are previously determined by a network administrator. Alternatively, the control apparatus 20a may automatically determine which one of the plurality of active paths is replaced by a standby path for recovery (the control apparatus 20a may determine the priority levels of the active paths).

In step S103, the route search unit 25 determines a bypass route and updates the relevant packet handling operations stored in the relevant nodes 10.

Figure 13:
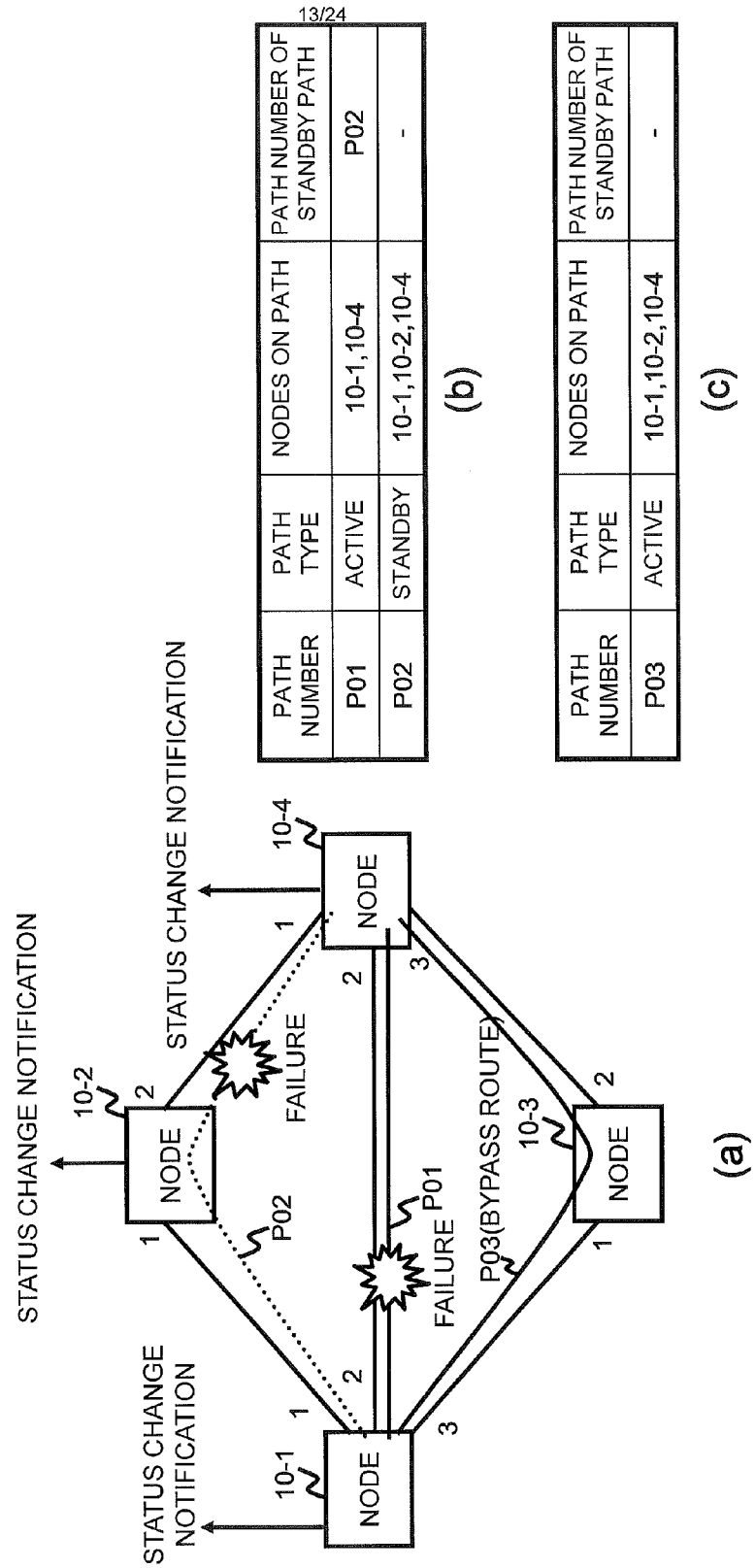
FIG. 13 illustrates an operation of determining a bypass route.

FIG. 13 illustrates an operation of determining a bypass route. Setting of a bypass route performed when both an active path and a standby path are affected by failures as illustrated in FIG. 8 will be described with reference to FIG. 13.

FIG. 13(b) illustrates path information stored before failures occur. As described above, the route search unit 25 searches for a bypass route for the active path P01. The route search unit 25 refers to the path information and recognizes that the nodes located at the ends of the active path P01 are the nodes 10-1 and 10-4. In addition, on the basis of the status change notifications received from the nodes 10-1, 10-2, and 10-4, the route search unit 25 recognizes that a failure has occurred in the link between the node 10-1 and 10-4 and between the nodes 10-2 and 10-4.

The route search unit 25 refers to the topology information (see FIG. 4) and determines a bypass route that avoids the node ports affected by these link failures. For example, in FIG. 13(a), the route search unit 25 determines the path P03 that extends between the node 10-1 and 10-4 to be the bypass route. Namely, the route search unit 25 refers to the topology information and sets the path P03 as a bypass route for the active path P01. After determining the bypass route, the route search unit 25 sets packet handling operations for realizing the bypass route in the relevant nodes 10 via the communication unit 24. In addition, the route search unit 25 updates the path information. FIG. 13(c) illustrates exemplary path information updated.

In this way, according to the present exemplary embodiment, when failures occur, the control apparatus 20a determines a bypass route for recovery from a failure and sets packet handling operations for realizing the bypass route in the relevant nodes 10. As a result, even when multiple failures that cannot be managed in the data plane alone occur, reliable and speedy failure recovery can be achieved.

[Third Exemplary Embodiment]

Next, a third exemplary embodiment will be described in detail with reference to the drawings.

In a communication system according to the present exemplary embodiment, the data plane is formed by OpenFlow switches including OAM functions, and OpenFlow is used as the control plane.

Figure 14:
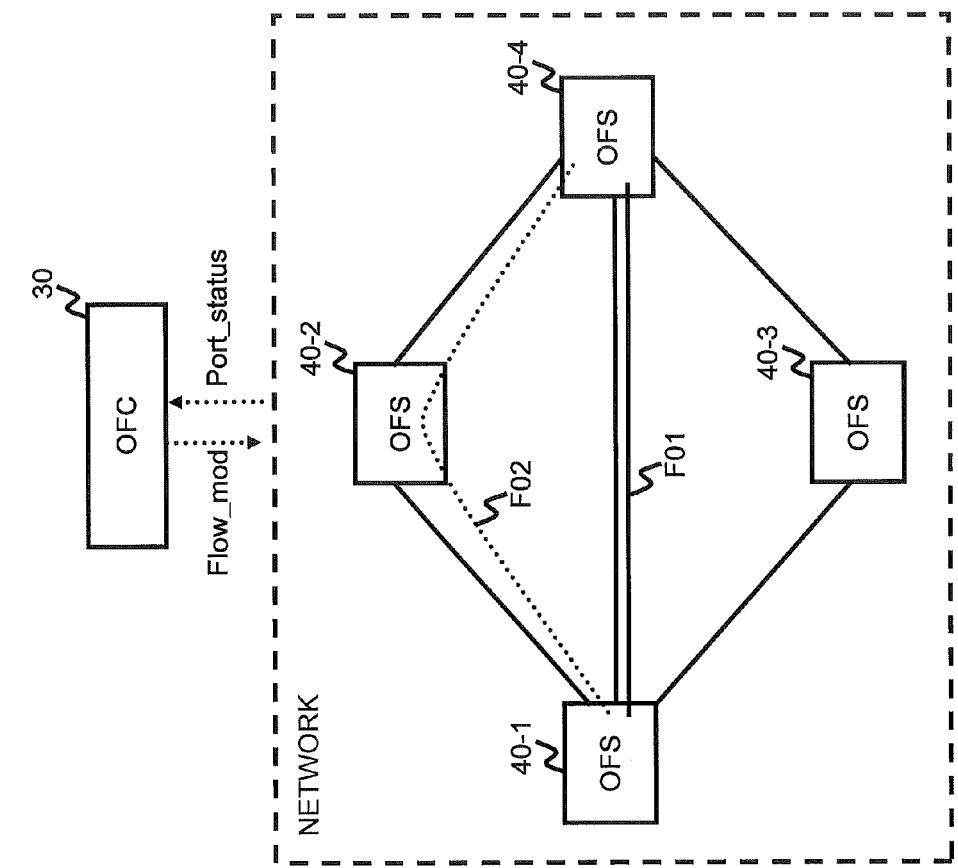
FIG. 14 illustrates an exemplary configuration of a communication system according to a third exemplary embodiment.

FIG. 14 illustrates an exemplary configuration of the communication system according to the present exemplary embodiment.

The communication system illustrated in FIG. 14 includes an OpenFlow controller (OFC) 30 and OpenFlow switches (OFS) 40-1 to 40-4. Each of the OpenFlow switches 40-1 to 40-4 includes OAM functions. In addition, flows are set among the OpenFlow switches 40-1 to 40-4. More specifically, in FIG. 14, flows F01 and F02 are set. The flow F01 is an active flow (a solid line in FIG. 14), and the flow F02 is a standby flow (a dotted line in FIG. 14). The standby flow F02 is used as a backup when a failure occurs in the active flow F01. In the following description, any one of the OpenFlow switches 40-1 to 40-4 will be referred to as a "OpenFlow switch 40" unless the OpenFlow switches 40-1 to 40-4 need to be distinguished from each other.

When detecting disconnection of a link between OpenFlow switches, each of the relevant OpenFlow switches 40 transmits a Port_status message to the OpenFlow controller 30.

On the basis of the Port_status messages transmitted from the OpenFlow switches 40 and topology information and flow information stored in the OpenFlow controller 30, the OpenFlow controller 30 determines whether route control for failure recovery is necessary (determines whether to perform route control). If the OpenFlow controller 30 determines that route control is necessary, the OpenFlow controller 30 searches for and determines a bypass route. In addition, the OpenFlow controller 30 transmits Flow_mod messages to the relevant OpenFlow switches 40 on the bypass route. The OpenFlow switches 40 update their own flow tables on the basis of the received Flow_mod messages, respectively. By causing the OpenFlow switches 40 to process received packets in accordance with the respective flow tables, the bypass route is realized (the flow is realized through the bypass route).

Figure 15:
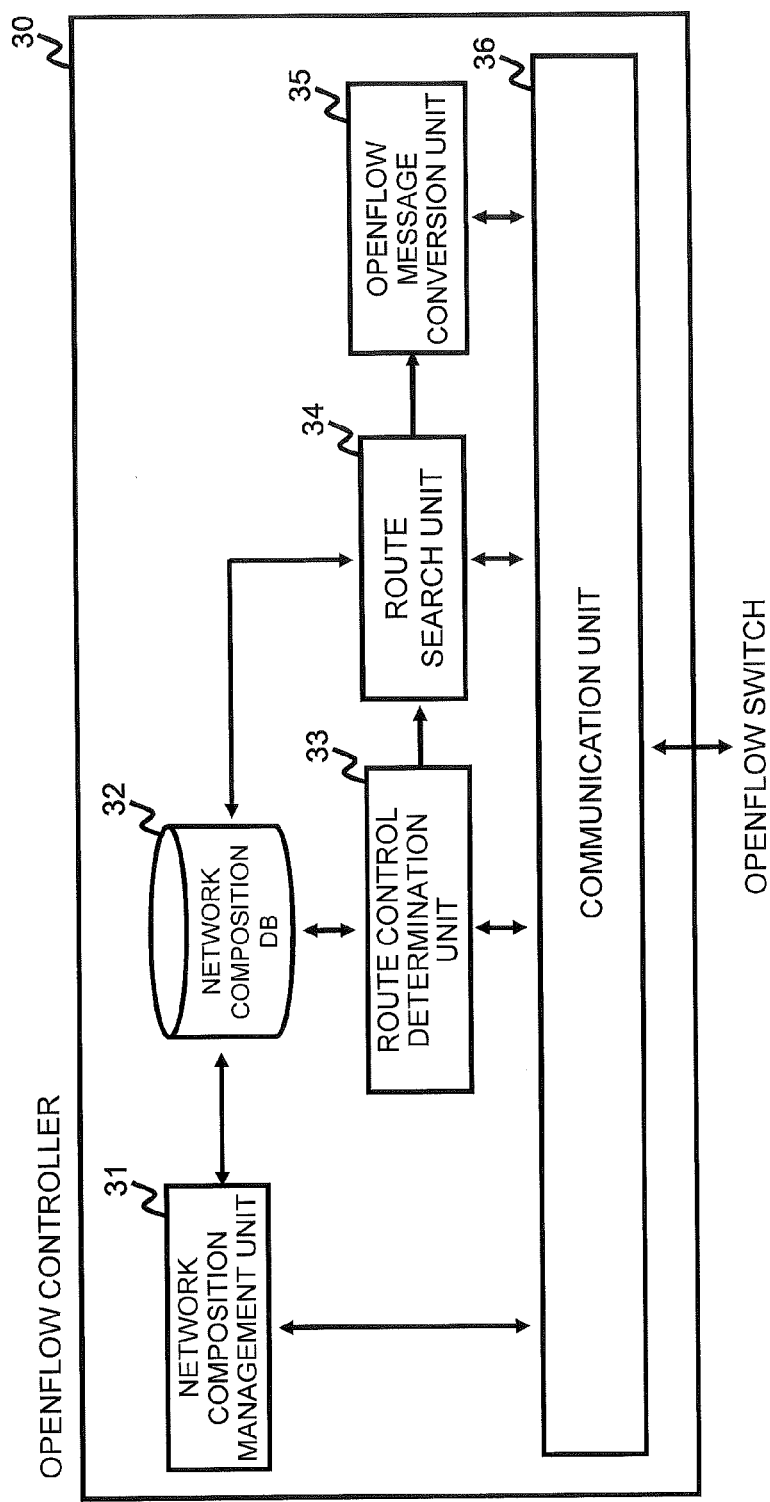
FIG. 15 illustrates an exemplary internal configuration of an OpenFlow controller 30.

FIG. 15 illustrates an exemplary internal configuration of the OpenFlow controller 30 according to the present exemplary embodiment. As illustrated in FIG. 15, the OpenFlow controller 30 includes a network composition management unit 31, a network composition database (network composition DB) 32, a route control determination unit 33, a route search unit 34, an OpenFlow message conversion unit 35, and a communication unit 36 that communicates with the OpenFlow switches 40 and so forth.

Since the functions of the network composition management unit 31 are the same as those of the network composition management unit 21 described in the first exemplary embodiment, detailed description of the network composition management unit 31 will be omitted. The network composition DB 32 is a database in which topology information and flow information are stored. Since the topology information is the same as that described in the first exemplary embodiment, detailed description of the topology information will be omitted. In addition, the flow information corresponds to the path information described in the first exemplary embodiment. Namely, flow attributes are defined in the flow information. For example, a flow type (active or standby) and information about a standby flow associated with an active flow (presence of and identification of a standby flow) are defined in the flow information.

When the communication unit 36 receives a Port_status message from an OpenFlow switch 40, if the Port_status message includes information about a link-down, the communication unit 36 notifies the route control determination unit 33 of information about the port affected by the link-down. More specifically, if a flag indicating a link-down is set in the Port_status message, the communication unit 36 notifies the route control determination unit 33 of the port information.

When receiving the information about the port affected by the link-down from the communication unit 36, the route control determination unit 33 refers to the topology information stored in the network composition DB 32 and determines the locations affected by the failure. In addition, the route control determination unit 33 refers to the flow information stored in the network composition DB 32, and determines a flow in which the failure has occurred. Then, the route control determination unit 33 determines whether a bypass route needs to be set for the flow. If the route control determination unit 33 determines that a bypass route needs to be set, the route control determination unit 33 notifies the route search unit 34 of information about the flow for which a bypass route is necessary.

On the basis of the information about the flow for which a bypass route is necessary, the information having been created by the route control determination unit 33, the route search unit 34 searches for a bypass route that avoids the failure that has occurred. The OpenFlow message conversion unit 35 is notified of information about the bypass route found.

The OpenFlow message conversion unit 35 converts the bypass route information supplied from the route search unit 34 into a Flow_mod messages and transmits the Flow_mod messages to the relevant OpenFlow switches 40, respectively, on the bypass route via the communication unit 36.

Figure 16:
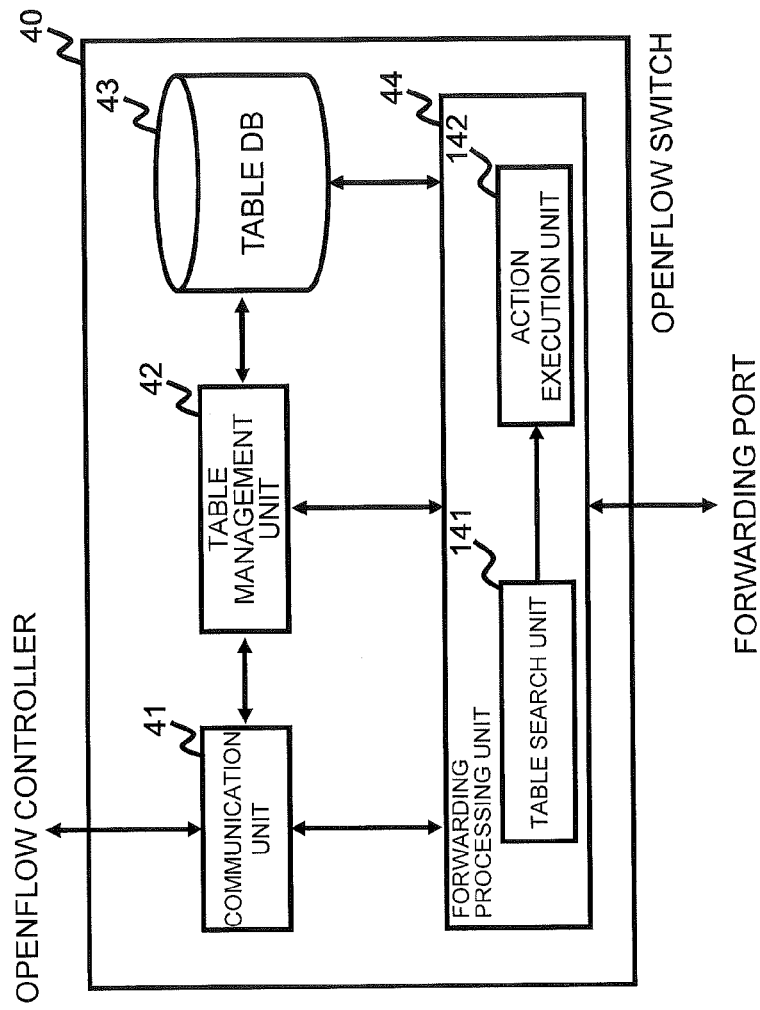
FIG. 16 illustrates an exemplary internal configuration of an OpenFlow switch 40.

FIG. 16 illustrates an exemplary internal configuration of an OpenFlow switch 40.

The OpenFlow switch 40 includes a communication unit 41, a table management unit 42, a table database (table DB) 43, and a forwarding processing unit 44.

The communication unit 41 is a means for realizing communication with the OpenFlow controller 30 that controls the OpenFlow switches 40. The communication unit 41 uses the OpenFlow protocol to communicate with the OpenFlow controller 30.

The table management unit 42 is a means for managing tables stored in the table DB 43. More specifically, the table management unit 42 registers a flow table set by the OpenFlow controller 30 in the table DB 43. In addition, the table management unit 42 manages a group table described below.

The table DB 43 is configured by a database that can store a flow table and a group table that are searched by the forwarding processing unit 44 when a received packet is processed.

The forwarding processing unit 44 includes a table search unit 141 and an action execution unit 142. The table search unit 141 is a means for searching the flow table stored in the table DB 43 for a rule (action) having a match field matching a received packet. The action execution unit 142 is a means for performing packet processing in accordance with processing defined in the instruction field in a rule found by the table search unit 141. Each OpenFlow switch 40 processes a received packet in accordance with processing defined in its own flow table and group table and achieves recovery from the corresponding failure.

Figure 17:
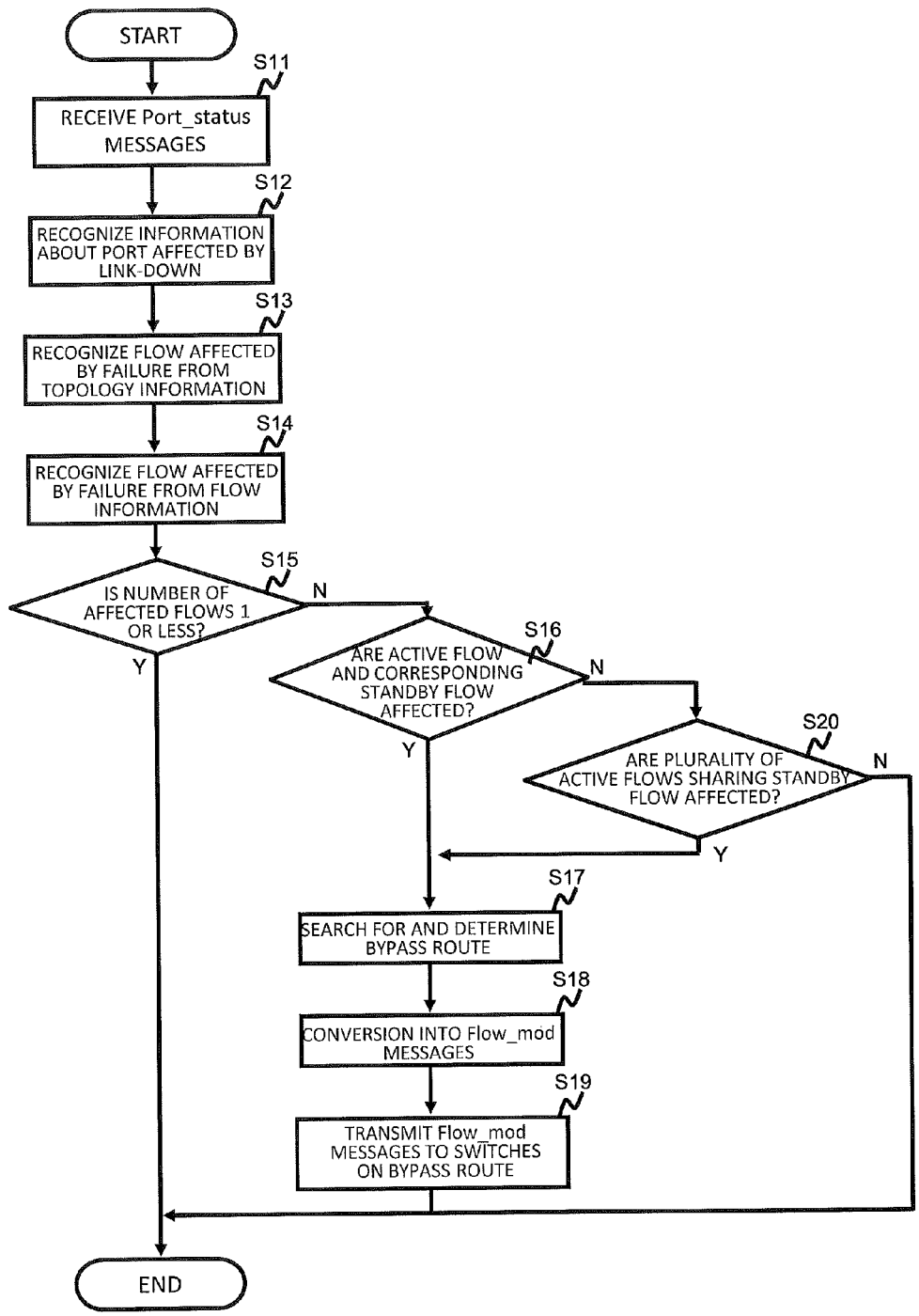
FIG. 17 is a flowchart illustrating an operation of the communication system according to the third exemplary embodiment.

Next, an exemplary operation according to the present exemplary embodiment will be described with reference to the drawings. FIG. 17 is only an example, and the operation of the communication system according to the present exemplary embodiment is not limited to that illustrated in the flowchart in FIG. 17.

In step S11, the communication unit 36 in the OpenFlow controller 30 receives a Port_status message from each of the relevant OpenFlow switches 40.

In step S12, the route control determination unit 33 recognizes information about the ports affected by a link-down(s) included in the Port_status messages.

Figure 18:
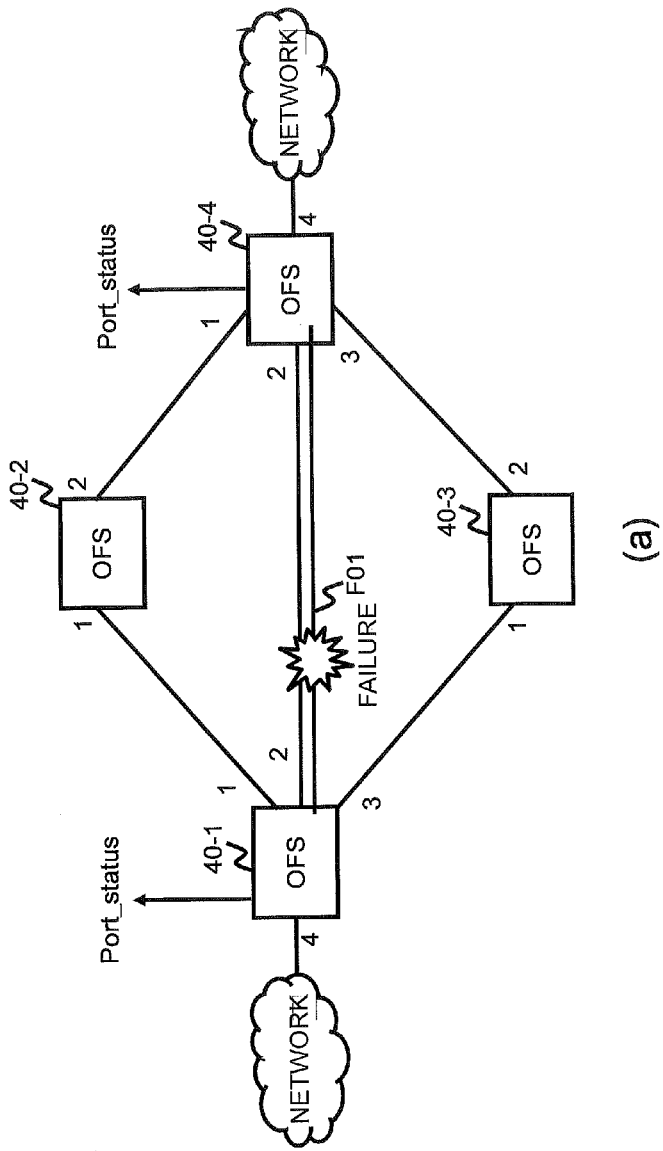
FIG. 18 illustrates exemplary Port_status messages.

FIG. 18 illustrates exemplary Port_status messages. FIG. 18(a) illustrates a port configuration of the OpenFlow switches 40. Illustration of the OpenFlow controller 30 will be omitted in FIG. 18 and the subsequent drawings.

Each OpenFlow switch 40 is provided with a data path identifier managed by the OpenFlow controller 30. For example, the OpenFlow switch 40-1 illustrated in FIG. 18 is provided with 0x0a as its data path identifier and the OpenFlow switch 40-2 is provided with 0x0b as its data path identifier (see FIG. 18(b)).

If a failure occurs in the flow F01 between the OpenFlow switches 40-1 and 40-4 in the network in FIG. 18(a), each of the OpenFlow switches 40-1 and 40-4 transmits a Port_status message. Namely, each of the OpenFlow switches 40 transmits information about its port affected by the link-down as a Port_status message to the OpenFlow controller 30. FIG. 18(c) illustrates an exemplary Port_status message transmitted from each of the OpenFlow switches 40-1 and 40-4. As illustrated in FIG. 18(a), since the ports 2 of the respective OpenFlow switches 40-1 and 40-4 are affected by the link-down, information about these ports are transmitted to the OpenFlow controller 30.

On the basis of the data path identifiers managed by the OpenFlow controller 30 and the Port_status messages, the OpenFlow controller 30 recognizes which ports of the OpenFlow switches 40 are affected by the link-down.

In step S13, the route control determination unit 33 in the OpenFlow controller 30 recognizes the locations affected by the failure on the basis of the information that has been transmitted from the OpenFlow switches 40 and that is about the ports affected by the link-down and the topology information stored in the network composition DB 32.

Figure 19:
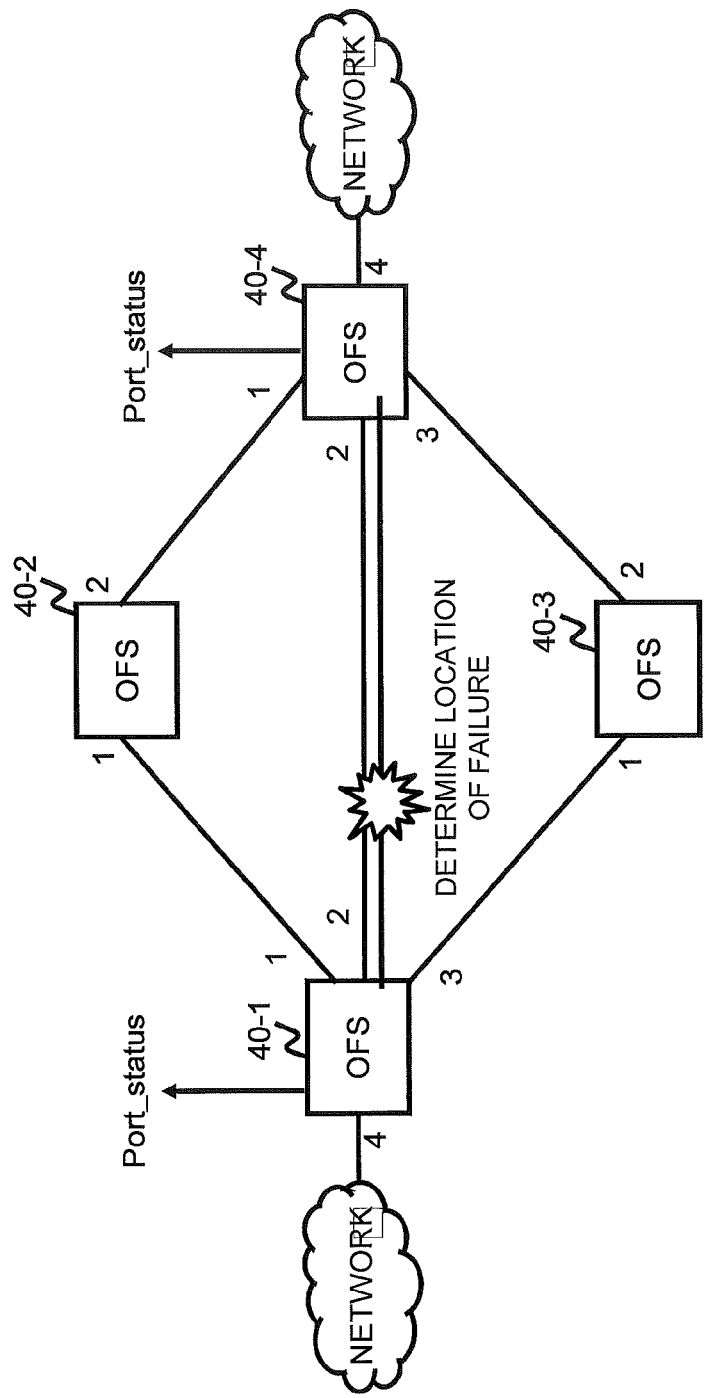
FIG. 19 illustrates an operation of recognizing the locations affected by a failure performed by a route control determination unit 33.

FIG. 19 illustrates an operation of recognizing the locations affected by a failure performed by the route control determination unit 33. For example, when the route control determination unit 33 receives the Port_status messages illustrated in FIG. 18(c), the route control determination unit 33 registers information, which indicates that the port 2 of the OpenFlow switch 40-1 provided with 0x0a as its data path identifier and the port 2 of the OpenFlow switch 40-4 provided with 0x0c as its data path identifier are affected by the link-down, in the topology information (updates the topology information in the network composition DB 32). As a result, occurrence of a failure between the OpenFlow switches 40-1 and 40-4 is recognized.

In step S14, on the basis of the updated topology information and the flow information, the route control determination unit 33 determines a flow affected by the failure. The flow affected by the failure is a flow that passes through the locations affected by the failure (in the above example, the OpenFlow switches 40-1 and 40-4).

In step S15, the route control determination unit 33 determines whether the number of flows affected by a failure(s) is 1 or less. If the number of flows affected by a failure(s) is 1 or less (Yes in step S15), the OpenFlow controller 30 ends the processing illustrated in FIG. 17. In such case, without relying on the control plane, the failure can be eliminated by the OAM functions, with which each of the OpenFlow switch 40 is provided. Thus, the OpenFlow controller 30 is not involved in the failure recovery operation.

Figure 20:
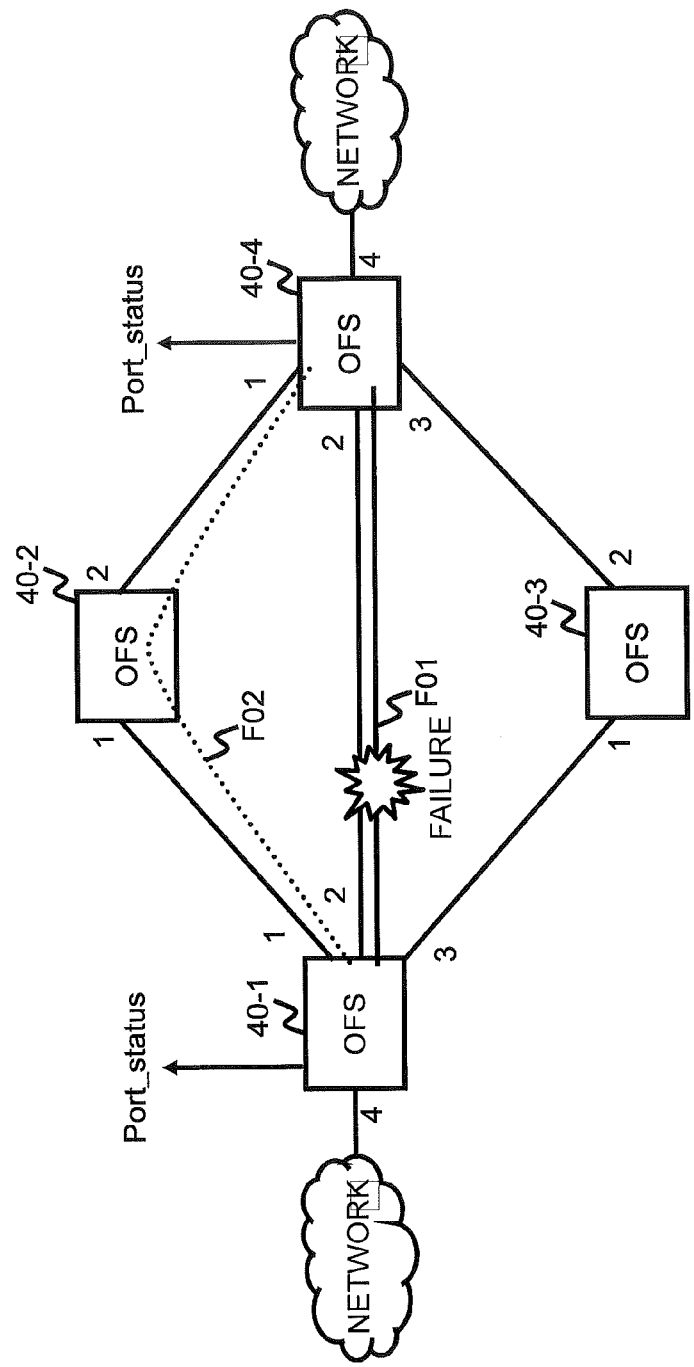
FIG. 20 illustrates an operation performed when the OpenFlow controller 30 is not involved in failure recovery.

FIG. 20 illustrates an operation performed when the OpenFlow controller 30 is not involved in failure recovery. In FIG. 20, the flow F01 set as an active flow is the flow affected by a failure. In addition, flow F02 is a standby flow for the flow F01.

In FIG. 20, the OpenFlow switches 40-1 and 40-4 use group tables, respectively, to perform failure recovery in the data plane (failure recovery without relying on the control plane).

FIG. 21 illustrates exemplary flow tables and group tables. FIGS. 21(a) and 21(c) illustrate exemplary flow tables included in the OpenFlow switches 40-1 and 40-4, respectively. FIGS. 21(b) and 21(d) illustrates exemplary group tables included in the OpenFlow switches 40-1 and 40-4, respectively. In FIGS. 21(a) and 21(c), illustration of the fields for the expiration condition and the statistical information is omitted.

As illustrated in FIG. 21(a), when the OpenFlow switch 40-1 receives a packet via a port 4 thereof, the OpenFlow switch 40-1 processes the packet in accordance with its group table. In addition, as illustrated in FIG. 21(b), "Action" and "type" are specified in the group table. In the examples in FIGS. 21(b) and 21(d), "Failover" is specified as the type and a monitored port (port whose life is monitored) is set as an action. For example, in the case of an action 1 illustrated in FIG. 21(b), if the life of the port 2 is confirmed, the OpenFlow switch 40-1 forwards the received packet via the port 2. For example, OAM signals are used to determine whether the port is alive.

In addition, "Fast Failover" is specified as the type specified in the group tables in the OpenFlow switches 40-1 and 40-4. In such case, the OpenFlow switches 40-1 and 40-4 search the actions in ascending order (action 1, action 2 . . . ) and executes an action corresponding to a port whose life is determined to be alive first. In the example illustrated in FIG. 21(b), the life of the port 2 is not recognized while the life of the port 1 is recognized. Thus, the OpenFlow switch 40-1 executes the action 2. In this way, when detecting a port link-down, the OpenFlow switch 40 forwards a received packet via a port determined to be alive in accordance with its flow table and group table that define processing on received packets.

Failure recovery using the group tables illustrated in FIG. 21 is performed on the basis of 1:1 protection. However, failure recovery on the basis of 1+1 protection is also possible. In the case of failure recovery on the basis of 1+1 protection, the type in the group table in the transmitting-end OpenFlow switch 40-1 is set to "ALL." In such case, no change is caused in the operation of the receiving-end switch. If ALL is set in the type in the group table, the actions set in the group table are executed simultaneously. For example, in the example in FIG. 21(b), both the actions 1 and 2 are executed and flows are simultaneously transmitted through ports 1 and 2. As a result, it is possible to perform an operation equivalent to the 1+1 protection in which active and standby flows are simultaneously transmitted and the receiving-end switch selects either one of the two flows.

If two or more flows are affected by failures (No in step S15), the route control determination unit 33 determines whether both an active flow and a standby flow corresponding to the active flow are affected by failures (step S16).

If both the active and standby flows are affected (Yes in step S16), the route search unit 34 searches for and determines a bypass route for the flow (step S17).

In step S18, the OpenFlow message conversion unit 35 converts the bypass route determined by the route search unit 34 into Flow_mod messages.

In step S19, the OpenFlow message conversion unit 35 transmits the Flow_mod messages to the relevant OpenFlow switches 40, respectively, on the bypass route via the communication unit 36.

Figure 22:
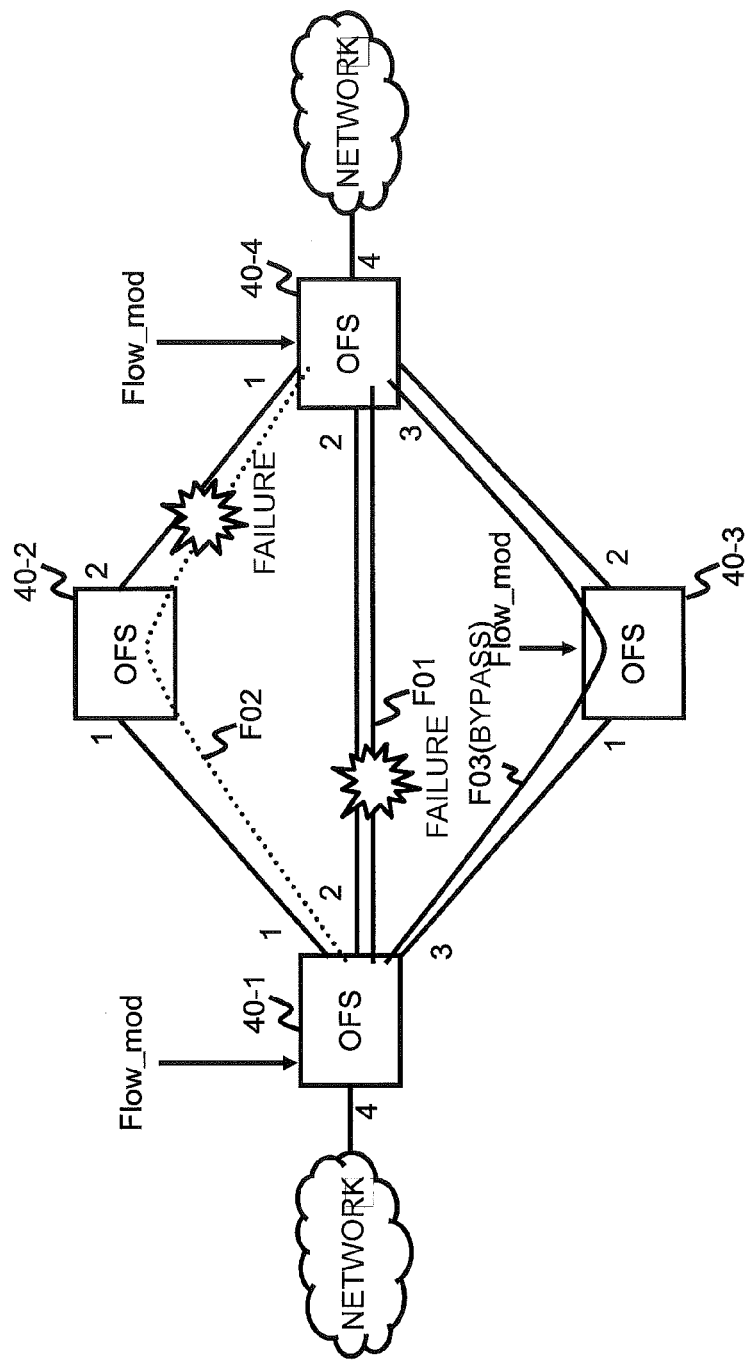
FIG. 22 illustrates setting of a bypass route performed by the OpenFlow controller 30.

FIG. 22 illustrates setting of a bypass route by the OpenFlow controller 30. The flows F01 and F02 illustrated in FIG. 22 are the flows affected by failures. The route search unit 34 determines a flow F03 to be a bypass route for the active flow F01. To realize the flow F03, the OpenFlow controller 30 transmits Flow_mod messages to the OpenFlow switches 40-1, 40-3, and 40-4, respectively, and updates the flow tables of these OpenFlow switches, respectively.

FIG. 23 illustrates exemplary tables updated by the Flow_mod messages. In the flow F03, the OpenFlow switch 40-1 serves as a transmitting-end switch. Thus, the OpenFlow controller 30 transmits a Flow_mod message to the OpenFlow switch 40-1 so that the flow received via the port 4 of the OpenFlow switch 40-1 is forwarded via the port 3 (see FIG. 23(a)). In this case, the action for referring to the group table is not set in the flow table in the OpenFlow switch 40-1. This is because the ports 1 and 2 cannot be determined to be alive (see FIG. 23(b).)

In flow F03, the OpenFlow switch 40-3 serves as a relay switch. Thus, the OpenFlow controller 30 transmits a Flow_mod message to the OpenFlow switch 40-3 so that the flow received via the port 1 of the OpenFlow switch 40-3 is forwarded via the port 2 (see FIG. 23(c)). Namely, since a new flow passes through the OpenFlow switch 40-3, the OpenFlow controller 30 transmits a Flow_mod message for adding a new rule in the flow table.

In the flow F03, the OpenFlow switch 40-4 serves as a receiving-end switch. Thus, the OpenFlow controller 30 transmits a Flow_mod message to the OpenFlow switch 40-4 so that the flow received via the port 3 of the OpenFlow switch 40-4 is forwarded via the port 4 (see FIG. 23(d)).

More specifically, a new condition is added in the flow table in the OpenFlow switch 40-4.

In addition, as illustrated in FIG. 24, the OpenFlow controller 30 may transmit Group_mod messages for updating the group tables in case the flows F01 and F02 recover (failback of the flows), in addition to such Flow_mod messages for changing the flow tables.

If both the active and standby flows are not affected by failures (No in step S16 in FIG. 17), the OpenFlow controller 30 determines whether a plurality of active flows sharing a standby flow are affected by failures (step S20).

If such active flows are affected by failures (Yes in step S20) and if only a single flow can be transmitted by using a standby path, a bypass route needs to be found for the other flow(s). Thus, if a plurality of active flows sharing a standby flow are affected by failures (Yes in step S20), the OpenFlow controller 30 performs steps S17 to S19.

If such plurality of active flows are not affected by failures (No in step S20), the OpenFlow controller 30 ends the operation. Namely, in such case, as in step S15, since failure recovery can be performed by the OAM functions in the data plane without relying on the control plane, the OpenFlow controller 30 is not involved in the failure recovery operation.

As described above, in the communication system according to the present exemplary embodiment, OpenFlow is adopted as the control plane, and whether failure recovery is necessary is determined promptly on the basis of the messages from the OpenFlow switches 40. Therefore, it is possible to respond to multiple failures in OpenFlow reliably while supporting speedy failure recovery in the data plane using the OAM functions.

Part or all of the above exemplary embodiments can be described (but not limited to) as follows:

[Mode 1]
(See the communication system according to the above first aspect)

[Mode 2]
The communication system according to mode 1;
wherein the control apparatus determines whether the route control is necessary for recovery from the failure(s) that has occurred in the network by using path information and topology information about the network as the information about the composition of the network.

[Mode 3]
The communication system according to mode 1 or 2;
wherein, when a number of paths affected by a failure(s) that has occurred in the network is 1 or less, the path being formed by at least two of the plurality of nodes, the control apparatus determines not to perform the route control.

[Mode 4]
The communication system according to any one of modes 1 to 3;
wherein, when an active path and a standby path that is associated with the active path are affected by failures that have occurred in the network, each of the paths being formed by at least two of the plurality of nodes, the control apparatus determines to perform the route control.

[Mode 5]
The communication system according to any one of modes 1 to 4;
wherein, when a plurality of active paths sharing a standby path are affected by failures that have occurred in the network, each of the paths being formed by at least two of the plurality of nodes, the control apparatus determines to perform the route control.

[Mode 6]
The communication system according to any one of modes 1 to 5;
wherein, when the control apparatus determines that the route control is necessary, the control apparatus searches for a path that avoids a failure that has occurred in the network on the basis of the information about the network.

[Mode 7]
The communication system according to any one of modes 1 to 6;
wherein each of the plurality of nodes requests a packet handling operation for processing packets; and
wherein the control apparatus creates a packet handling operation for processing received packets in response to the request and notifies at least one of the plurality of nodes of the created packet handling operation.

[Mode 8]
The communication system according to any one of modes 1 to 7;
wherein, when any one of the plurality of nodes detects a port whose link is down, in accordance with a flow table and a group table that define processing on received packets, the node forwards the received packets via a port other than the port whose link is down.

[Mode 9]
(See the control apparatus according to the above second aspect)

[Mode 10]
The control apparatus according to mode 9;
wherein the route control determination unit determines whether the route control is necessary for recovery from the failure(s) that has occurred in the network by using path information and topology information about the network as the information about the composition of the network.

[Mode 11]
The control apparatus according to mode 9 or 10;
wherein, when a number of paths affected by a failure(s) that has occurred in the network is 1 or less, the path being formed by at least two of the plurality of nodes, the route control determination unit determines not to perform the route control.

[Mode 12]
The control apparatus according to any one of modes 9 to 11;
wherein, when an active path and a standby path that is associated with the active path are affected by failures that have occurred in the network, each of the paths being formed by at least two of the plurality of nodes, the route control determination unit determines to perform the route control.

[Mode 13]
The control apparatus according to any one of modes 9 to 12;
wherein, when a plurality of active paths sharing a standby path are affected by failures that have occurred in the network, each of the paths being formed by at least two of the plurality of nodes, the route control determination unit determines to perform the route control.

[Mode 14]
The control apparatus according to any one of modes 9 to 13, including:
a route search unit searches, when the route control determination unit determines that the route control is necessary, for a path that avoids the failure(s) that has occurred in the network on the basis of information about the network.

[Mode 15]
(See the control apparatus control method according to the above third aspect)

[Mode 16]
The control apparatus control method according to mode 15;
wherein, in the step of determining whether to perform the route control, whether the route control is necessary for recovery from the failure(s) that has occurred in the network is determined by using path information and topology information about the network as the information about the composition of the network.

[Mode 17]
The control apparatus control method according to mode 15 or 16;
wherein, in the step of determining whether to perform the route control, when a number of paths affected by a failure(s) that has occurred in the network is 1 or less, the path being formed by at least two of the plurality of nodes, it is determined that the route control is not performed.

[Mode 18]
The control apparatus control method according to any one of modes 15 to 17;
wherein, in the step of determining whether to perform the route control, when an active path and a standby path that is associated with the active path are affected by failures that have occurred in the network, each of the paths being formed by at least two of the plurality of nodes, it is determined that the route control is performed.

[Mode 19]
The control apparatus control method according to any one of modes 15 to 18;
wherein, in the step of determining whether to perform the route control, when a plurality of active paths sharing a standby path are affected by failures that have occurred in the network, each of the paths being formed by at least two of the plurality of nodes, it is determined that the route control is performed.

[Mode 20]
The control apparatus control method according to any one of modes 15 to 19, including a step of:
searching, when it is determined that the route control is performed in the step of determining whether to perform the route control, for a path that avoids the failure(s) that has occurred in the network on the basis of information about the network.

[Mode 21]
(See the program according to the above fourth aspect)

[Mode 22]
The program according to mode 21;
wherein, in the processing for determining whether to perform the route control, whether the route control is necessary for recovery from the failure(s) that has occurred in the network is determined by using path information and topology information about the network as the information about the composition of the network.

[Mode 23]
The program according to mode 21 or 22;
wherein, in the processing for determining whether to perform the route control, when a number of paths affected by a failure(s) that has occurred in the network is 1 or less, the path being formed by at least two of the plurality of nodes, it is determined that the route control is not performed.

[Mode 24]
The program according to any one of modes 21 to 23;
wherein, in the processing for determining whether to perform the route control, when an active path and a standby path that is associated with the active path are affected by failures that have occurred in the network, each of the paths being formed by at least two of the plurality of nodes, it is determined that the route control is performed.

[Mode 25]
The program according to any one of modes 21 to 24;
wherein, in the processing for determining whether to perform the route control, when a plurality of active paths sharing a standby path are affected by failures that have occurred in the network, each of the paths being formed by at least two of the plurality of nodes, it is determined that the route control is performed.

[Mode 26]
The program according to any one of modes 21 to 25;
causing the computer to perform processing for:
searching, when it is determined that the route control is performed in the processing for determining whether to perform the route control, for a path that avoids the failure(s) that has occurred in the network on the basis of information about the network.

The disclosure of each of the above PTLs is incorporated herein by reference thereto. Modifications and adjustments of the exemplary embodiments and the examples are possible within the scope of the overall disclosure (including the claims) of the present invention and based on the basic technical concept of the present invention. In addition, various combinations and selections of various disclosed elements (including the elements in each of the claims, exemplary embodiments, examples, drawings, etc.) are possible within the scope of the claims of the present invention. Namely, the present invention of course includes various variations and modifications that could be made by those skilled in the art according to the overall disclosure including the claims and the technical concept. In particular, the present description discloses numerical value ranges. However, even if the description does not particularly disclose arbitrary numerical values or small ranges included in the ranges, these values and ranges should be deemed to have been specifically disclosed.

REFERENCE SIGNS LIST 10, 10-1 to 10-5, 100 node
20, 20a, 101 control apparatus
21, 31 network composition management unit
22, 32 network composition database (network composition DB)
23, 23a, 33 route control determination unit
24, 36, 41 communication unit
25, 34 route search unit
30 OpenFlow controller
35 OpenFlow message conversion unit
40, 40-1 to 40-4 OpenFlow switch
42 table management unit
43 table database (table DB)
44 forwarding processing unit
141 table search unit
142 action execution unit

What is claimed is:
1. A control apparatus control method, comprising:
receiving, from at least one of a plurality of nodes each of which includes OAM (Operation Administration and Maintenance) functions, a status change notification including information about a port(s) affected by a failure(s) that has occurred in a network composed by the plurality of nodes; and determining whether to perform route control on the network on a basis of the status change notification and information about a composition of the network, wherein, in the determining whether to perform route control, when a number of paths affected by a failure(s) that has occurred in the network is 1, the path being formed by at least two of the plurality of nodes, it is determined that the route control is not performed.

2. The control apparatus control method according to claim 1, wherein, in the determining whether to perform the route control, whether the route control is necessary for recovery from the failure(s) that has occurred in the network is determined by using path information and topology information about the network as the information about the composition of the network.

3. The control apparatus control method according to claim 1, wherein, in the determining whether to perform the route control, when an active path and a standby path that is associated with the active path are affected by failures that have occurred in the network, each of the paths being formed by at least two of the plurality of nodes, it is determined that the route control is performed.

4. The control apparatus control method according to claim 1, wherein, in the determining whether to perform the route control, when a plurality of active paths sharing a standby path are affected by failures that have occurred in the network, each of the paths being formed by at least two of the plurality of nodes, it is determined that the route control is performed.

5. The control apparatus control method according to claim 1, further comprising:

searching, when it is determined that the route control is performed in the determining whether to perform the route control, for a path that avoids the failure(s) that has occurred in the network on the basis of information about the network.

6. A communication system, comprising:

a plurality of nodes each of which includes OAM (Operation Administration and Maintenance) functions; and a control apparatus that controls the plurality of nodes, wherein said each of the plurality of nodes transmits a status change notification including information about a port(s) affected by a failure(s) that has occurred in a network composed by the plurality of nodes to the control apparatus, and wherein the control apparatus determines whether to perform route control on the network on a basis of the status change notification and information about a composition of the network, wherein, when a number of paths affected by a failure(s) that has occurred in the network is 1, the path being formed by at least two of the plurality of nodes, the control apparatus determines not to perform the route control.

7. The communication system according to claim 6, wherein the control apparatus determines whether the route control is necessary for recovery from the failure(s) that has occurred in the network by using path information and topology information about the network as the information about the composition of the network.

8. The communication system according to claim 6, wherein, when an active path and a standby path that is associated with the active path are affected by failures that have occurred in the network, each of the paths being formed by at least two of the plurality of nodes, the control apparatus determines to perform the route control.

9. The communication system according to claim 6, wherein, when a plurality of active paths sharing a standby path are affected by failures that have occurred in the network, each of the paths being formed by at least two of the plurality of nodes, the control apparatus determines to perform the route control.

10. The communication system according to claim 6, wherein, when the control apparatus deteimines that the route control is necessary, the control apparatus searches for a path that avoids a failure that has occurred in the network on the basis of the information about the network.

11. The communication system according to claim 6, wherein said each of the plurality of nodes requests a packet handling operation for processing packets, and wherein the control apparatus creates a packet handling operation for processing received packets in response to the request and notifies at least one of the plurality of nodes of the created packet handling operation.

12. The communication system according to claim 6, wherein, when any one of the plurality of nodes detects a port whose link is down, in accordance with a flow table and a group table that define processing on received packets, the node forwards the received packets via a port other than the port whose link is down.

13. A control apparatus, comprising:

a communication unit that receives, from at least one of a plurality of nodes each of which includes OAM (Operation Administration and Maintenance) functions, a status change notification including information about a port(s) affected by a failure(s) that has occurred in a network composed by the plurality of nodes; and a route control determination unit that determines whether to perform route control on the network on a basis of the status change notification and information about a composition of the network, wherein, when a number of paths affected by a failure(s) that has occurred in the network is 1, the path being formed by at least two of the plurality of nodes, the route control determination unit determines not to perform the route control.

14. The control apparatus according to claim 13, wherein the route control determination unit determines whether the route control is necessary for recovery from the failure(s) that has occurred in the network by using path information and topology information about the network as the information about the composition of the network.

15. The control apparatus according to claim 13, wherein, when an active path and a standby path that is associated with the active path are affected by failures that have occurred in the network, each of the paths being formed by at least two of the plurality of nodes, the route control determination unit determines to perform the route control.

16. The control apparatus according to claim 13, wherein, when a plurality of active paths sharing a standby path are affected by failures that have occurred in the network, each of the paths being formed by at least two of the plurality of nodes, the route control determination unit determines to perform the route control.

17. The control apparatus according to claim 13, further comprising:

a route search unit that searches, when the route control determination unit determines that the route control is necessary, for a path that avoids the failure(s) that has occurred in the network on a basis of information about the network.

18. A non-transitory computer-readable recording medium storing a program, causing a computer embedded on controlling a control apparatus to execute processing for:

receiving, from at least one of a plurality of nodes each of which includes OAM (Operation Administration and Maintenance) functions, a status change notification including information about a port(s) affected by a failure(s) that has occurred in a network composed by the plurality of nodes; and determining whether to perform route control on the network on a basis of the status change notification and information about a composition of the network, wherein, in the processing for the determining whether to perform route control, when a number of paths affected by a failure(s) that has occurred in the network is 1, the path being formed by at least two of the plurality of nodes, it is determined that the route control is not performed.

19. The medium according to claim 18, wherein, in the processing for the determining whether to perform the route control, whether the route control is necessary for recovery from the failure(s) that has occurred in the network is detennined by using path information and topology information about the network as the information about the composition of the network.

20. The medium according to claim 18, wherein, in the processing for the determining whether to perform the route control, when an active path and a standby path that is associated with the active path are affected by failures that have occurred in the network, each of the paths being formed by at least two of the plurality of nodes, it is determined that the route control is performed.

21. The medium according to claim 18, wherein, in the processing for the determining whether to perform the route control, when a plurality of active paths sharing a standby path are affected by failures that have occurred in the network, each of the paths being formed by at least two of the plurality of nodes, it is determined that the route control is performed.

22. The medium according to claim 18, further causing the computer to perform processing for:

searching, when it is determined that the route control is performed in the processing for the determining whether to perform the route control, for a path that avoids the failure(s) that has occurred in the network on the basis of information about the network.

23. A communication system, comprising:

a plurality of nodes each of which includes OAM (Operation Administration and Maintenance) functions; and a control apparatus that controls the plurality of nodes, wherein said each of the plurality of nodes transmits a status change notification including information about a port(s) affected by a failure(s) that has occurred in a network composed by the plurality of nodes to the control apparatus, and wherein the control apparatus determines whether to perform route control on the network on a basis of the status change notification and information about a composition of the network, wherein, when a number of paths affected by a failure(s) that has occurred in the network is 1, the path being formed by at least two of the plurality of nodes, the control apparatus determines not to perform the route control, and the failure(s) occurred in the network is recovered by the OAM functions of the plurality of nodes, and wherein, when a number of paths affected by a failure(s) that has occurred in the network is 2 or more, the control apparatus determines whether to perform route control so as to recover the failure(s) occurred in the network or not.

* * * * *